(12) United States Patent
Hicks et al.

(10) Patent No.: US 7,274,670 B2
(45) Date of Patent: Sep. 25, 2007

(54) METHODS, SYSTEMS AND COMPUTER PROGRAM PRODUCTS FOR ASSESSING NETWORK QUALITY

(75) Inventors: Jeffrey Todd Hicks, Cary, NC (US); John Lee Wood, Raleigh, NC (US); Gary Michael Weichinger, Cary, NC (US); Steven Thomas Joyce, Raleigh, NC (US)

(73) Assignee: NetIQ Corporation, San Jose, CA (US)

( * ) Notice: Subject to any disclaimer, the term of this patent is extended or adjusted under 35 U.S.C. 154(b) by 1128 days.

(21) Appl. No.: 10/259,564

(22) Filed: Sep. 27, 2002

(65) Prior Publication Data

US 2004/0064760 A1 Apr. 1, 2004

(51) Int. Cl.
*H04L 12/26* (2006.01)
(52) U.S. Cl. ...................... 370/252; 370/356
(58) Field of Classification Search ............... 370/252, 370/356
See application file for complete search history.

(56) References Cited

U.S. PATENT DOCUMENTS 5,881,237 A 3/1999 Schwaller et al. ..... 395/200.54

| | | | |
|---|---|---|---|
| 2004/0215448 A1* | 10/2004 | Funatsu et al. | 704/201 |
| 2005/0141493 A1* | 6/2005 | Hardy et al. | 370/356 |
| 2006/0153174 A1* | 7/2006 | Towns-von Stauber et al. | 370/356 |

OTHER PUBLICATIONS

ETSI TR 101329-6 v2.1.1 Technical Report, Telecommunications and Internet Protocol Harmonization Over Networks (TIPHON) Release 3; End-to-end Quality of Service in TIPHON systems; Part 6; Actual measurements of network and terminal characteristics and performance parameters in TIPHON networks and their influence on voice quality (Feb. 2002), pp. 1-57.*
Birger, *Getting in Sync: A Look at NTP*, Spirentcom.com, 1st Quarter 2001, pp. 14-15.

(Continued)

*Primary Examiner*—Melvin Marcelo
(74) *Attorney, Agent, or Firm*—Myers Bigel Sibley & Sajovec PA

(57) ABSTRACT

Methods, systems and computer program products are provided for evaluating performance of a network that supports packetized communications. A network test protocol that is associated with the packetized communication is initiated and network performance data is obtained based on the initiated network test protocol. An overall network quality rating is generated based on the obtained performance data and a network impairment indicator is calculated based on the overall network quality rating.

83 Claims, 17 Drawing Sheets

OTHER PUBLICATIONS

Mills, *Network Time Protocol (Version 3) Specification, Implementation and Analysis*, Network Working Group, Request for Comments-1305, Mar. 1992.
www.cisco.com/univercd/cc/td/doc/product/voice/ip_tele/avvidquos/qosintro.htm#90219, Net IQ Corp.
Clark et al., *Modeling the Effects of Burst Packet Loss and Recency on Subjective Voice Quality*.
Brochure "Monitoring Voice Quality in Voice Over IP Networks", Telchemy.
Agilent Technologies Telegra VQT PAMS Implementation Summary, Agilent Technologies, Jul. 11, 2000.
Brochure Agilent Technologies Product Overview, May 30, 2001.
Brochure Network Quality Monitoring Systems, Consultronics, Inc.
Brochure Hammer Voice Quality Server (VQS), Emprix.
Brochure ITU-T G. 107, Series G: Transmission Systems and Media, Digital Systems and Networks, May 2000.
Telecommunications IP Telephony Equipment PN-4689 (to be published as TIA/EIA/TSB116).
Brochure ITU-T G-108, Series G: Transmission Systems and Media, Digital Systems and Networks, Sep. 1999.
Telecommunications and Internet Protocol Harmonization Over Networks (TIPHON) Part 5: Quality of Service (QoS) Measurement Methodologies, Draft TS 101 329-5, (2000).
Brochure ITU-T G.113, Series G: Transmission Systems and Media, Digital Systems and Networks, Sep. 1999.
Brochure ITU-T P.800, Series P: Telephone Transmission Quality, Aug. 1996.
www.concord.com/help/files/reports/general/hlthindx.html, Concord Health Index, 1999.
www1.avaya.com/enterprise/news/docs/expertnet.html, Avaya ExpertNetSM VoIP Assessment Tool, 2002.
www.violanetworks.com/products.asp, Viola Networks NetAlly, 2002.

\* cited by examiner

METHODS, SYSTEMS AND COMPUTER PROGRAM PRODUCTS FOR ASSESSING NETWORK QUALITY

FIELD OF THE INVENTION

The present invention, generally, relates to network communication methods, systems and computer program products and, more particularly, to methods, systems and computer program products for assessing the performance of computer networks.

BACKGROUND OF THE INVENTION

Companies are often dependent on mission-critical network applications to stay productive and competitive. To achieve this, information technology (IT) organizations preferably provide reliable application performance on a 24-hour, 7-day-a-week basis. One known approach to network performance testing to aid in this task is described in U.S. Pat. No. 5,881,237 ("the 237 patent") entitled Methods, Systems and Computer Program Products for Test Scenario Based Communications Network Performance Testing, which is incorporated herein by reference as if set forth in its entirety. As described in the '237 patent, a test scenario simulating actual applications communication traffic on the network is defined. The test scenario may specify a plurality of endpoint node pairs on the network that are to execute respective test scripts to generate active traffic on the network. Various performance characteristics are measured while the test is executing. The resultant data may be provided to a console node, coupled to the network, which may also initiate execution of the test scenario by the various endpoint nodes. The endpoint nodes may execute the tests as application level programs on existing endpoint nodes of a network to be tested, thereby using the actual protocol stacks of such devices without reliance on the application programs available on the endpoints.

One application area of particular interest currently is in the use of a computer network to support voice communications. More particularly, packetized voice communications are now available using data communication networks, such as the Internet and intranets, to support voice communications typically handled in the past over a conventional switched telecommunications network (such as the public switched telephone network (PSTN)). Calls over a data network typically rely on codec hardware and/or software for voice digitization so as to provide the packetized voice communications. However, unlike conventional data communications, user perception of call quality for voice communications is typically based on their experience with the PSTN, not with their previous computer type application experiences. As a result, the types of network evaluation supported by the various approaches to network testing described above are limited in their ability to model user satisfaction for this unique application.

A variety of different approaches have been used in the past to provide a voice quality score for voice communications. The conventional measure from the analog telephone experience is the Mean Opinion Score (MOS) described in ITU-T recommendation P.800 available from the International Telecommunications Union. In general, the MOS is derived from the results of humans listening and grading what they hear from the perspective of listening quality and listening effort. A Mean Opinion Score ranges from a low of 1.0 to a high of 5.0.

The MOS approach is beneficial in that it characterizes what humans think at a given time based on a received voice signal. However, human MOS data may be expensive and time consuming to gather and, given its subjective nature, may not be easily repeatable. The need for humans to participate as evaluators in a test every time updated information is desired along with the need for a voice over IP (VoIP) equipment setup for each such test contribute to these limitations of the conventional human MOS approach. Such advance arrangements for measurements may limit when and where the measurements can be obtained. Human MOS is also generally not well suited to tuning type operations that may benefit from simple, frequent measurements. Human MOS may also be insensitive to small changes in performance, such as those used for tuning network performance by determining whether or not an incremental performance change following a network change was an improvement.

Objective approaches include the perceptual speech quality measure (PSQM) described in ITU-T recommendation P.861, the perceptual analysis measurement system (PAMS) described by British Telecom, the measuring normalized blocks (MNB) measure described in ITU-T P.861 and the perceptual evaluation of speech quality (PESQ) described in ITU-T recommendation P.862. Finally, the E-model, which describes an "R-value" measure, is described in ITU-T recommendation G.107. The PSQM, PAMS and PESQ approaches typically compare analog input signals to output signals that may require specialized hardware and real analog signal measurements.

From a network perspective, evaluation for voice communications may differ from conventional data standards, particularly as throughput and/or response time may not be the critical measures. A VoIP phone call generally consists of two flows, one in each direction. Such a call typically does not need much bandwidth. However, the quality of a call, how it sounds, generally depends on three things: the one-way delay from end to end, how many packets are lost and whether that loss is in bursts, and the variation in arrival times, herein referred to as jitter.

In light of these differences, it may be desirable to determine if a network is even capable of supporting VoIP before deployment of such a capability. If the initial evaluation indicates that performance will be unsatisfactory or that existing traffic will be disrupted, it would be helpful to determine what to change in the network architecture to provide an improvement in performance for both VoIP and the existing communications traffic. As the impact of changes to various network components may not be predictable, thus requiring empirical test results, it would also be desirable to provide a repeatable means for iteratively testing a network to isolate the impact of individual changes to the network configuration.

However, the various voice evaluation approaches discussed above do not generally factor in human perception, acoustics or the environment effectively in a manner corresponding to human perception of voice quality. Such approaches also typically do not measure in two directions at the same time, thus, they may not properly characterize the two flows of a VoIP call, one in each direction. These approaches also do not typically scale to multiple simultaneous calls or evaluate changes during a call, as compared with a single result characterizing the entire call. Of these models, only the E-model is generally network based in that it may take into account network attributes, such as codec, jitter buffer, delay and packet loss and model how these affect call quality scores.

An approach for testing network performance is discussed in commonly assigned U.S. patent application Ser. No. 09/951,050, filed on Sep. 11, 2001, the disclosure of which is hereby incorporated herein by reference as if set forth herein in its entirety. This patent application, entitled Methods, Systems and Computer Program Products for Packetized Voice Network Evaluation, addresses many of the shortcomings of the existing approaches discussed above. However, improved methods of assessing network performance as well as methods of presenting performance results to a customer or user may be desirable.

SUMMARY OF THE INVENTION

Embodiments of the present invention provide methods, systems and computer program products for evaluating performance of a network that supports packetized communications. A network test protocol that is associated with the packetized communication is initiated and network performance data is obtained based on the initiated network test protocol. An overall network quality rating is generated based on the obtained performance data and a network impairment indicator is calculated based on the overall network quality rating.

In some embodiments of the present invention a network impairment indicator may be calculated by calculating a maximum overall call quality rating for the network test protocol and calculating a constrained network impairment indicator for the quality factors. The network impairment indicator for the quality factors may be generated based on the maximum overall call quality rating and the calculated constrained network impairment indicator for the quality factors.

In further embodiments of the present invention the obtained performance data may include a timing record for a first flow direction and a second flow direction and calculating the constrained network impairment indicator for the quality factors may include calculating a constrained impairment indicator for the quality factors for respective timing records based on the maximum overall call quality rating. The network impairment indicator may be generated for the quality factors by generating an average of the calculated constrained impairment indicators for the quality factors.

In still further embodiments of the present invention, the overall call quality rating may include an actual overall call quality rating. A difference between the maximum overall call quality and the actual overall call quality rating may be calculated. A network impairment ratio corresponding to respective network impairment indicators may be calculated based on the difference between the maximum overall call quality rating and the actual overall call quality rating and corresponding network impairment indicators.

In some embodiments of the present invention, the network impairment ratios corresponding to respective network impairment indicators may be calculated by dividing the network impairment indicators for the quality factors by the difference between the maximum overall call quality rating and the actual overall call quality rating. The actual overall call quality may include an R-Value and/or a MOS value and the maximum overall call quality may include an R-Value and/or a MOS value.

In further embodiments of the present invention, the packetized communications may include packetized voice communications and initiating the network test may include defining a call script. Defining a call script may include configuring a codec, a jitter buffer, a quality of service (QoS), a speech packet size, a number of concurrent calls, a delay between packets, a fixed delay and/or silence suppression. Connections and/or endpoints for the network test protocol may be selected. A total duration of the network test protocol, a duration of each individual call and/or an interval between calls may be scheduled. The test of the selected connections and/or endpoints for the scheduled duration may be verified, which may include running the network test protocol for a period of less than the total duration of the network test protocol. Finally, the network test protocol may be initiated if the test is verified. In some embodiments, the period less than the total duration of the network test protocol includes a period of no more than about 30 seconds.

In still further embodiments of the present invention, a result summary of the network test protocol may be generated. In some embodiments, the packetized communications may be packetized voice communications and the overall network quality rating may be an overall call quality rating. In these embodiments, the result summary may be generated by generating overall call quality rating for the calls initiated during execution of the network test protocol. The overall call quality ratings for each of the calls initiated may be associated with the quality thresholds. A chart may be generated that groups by the associated quality thresholds calls initiated during execution of the network test protocol. The chart may indicate a percentage of a total number of calls associated with the quality thresholds. The chart may be a pie chart and the quality thresholds may have a different associated visual indication on the pie chart.

In some embodiments of the present invention, the quality thresholds include a good threshold, an acceptable threshold, a poor threshold and/or an unavailable threshold. These quality thresholds may be user configurable. The good quality threshold may indicate a mean opinion score (MOS) of about 4.0 or above. The acceptable quality threshold may indicate a MOS of from about 3.60 to about 4.0. The poor quality threshold may indicate a MOS of about 3.60 or less. The unavailable quality threshold may indicate that a call could not be connected.

In further embodiments of the present invention, the result summary may include a chart that illustrates network impairment ratios corresponding to respective ones of the quality factors. The chart may be a pie chart and each of the network impairment ratios may have a different associated visual indication on the pie chart.

In still further embodiments of the present invention, multiple calls over a connection between a first endpoint and a second endpoint utilizing the same call script may define a call group. The result summary may be generated to include a chart illustrating call quality by call group. The result summary may further include a daily call quality summary and/or an hourly call quality summary.

In some embodiments of the present invention, the call script may be configured to simulate network traffic corresponding to an existing Internet Protocol (IP) phone profile.

In further embodiments of the present invention, the packetized communications may be packetized video communications and the network test protocol may be associated with the packetized video communications.

While described above primarily with reference to methods, systems and computer program products are also provided in accordance with further embodiments of the present invention.

DETAILED DESCRIPTION OF THE INVENTION

Figure 1:
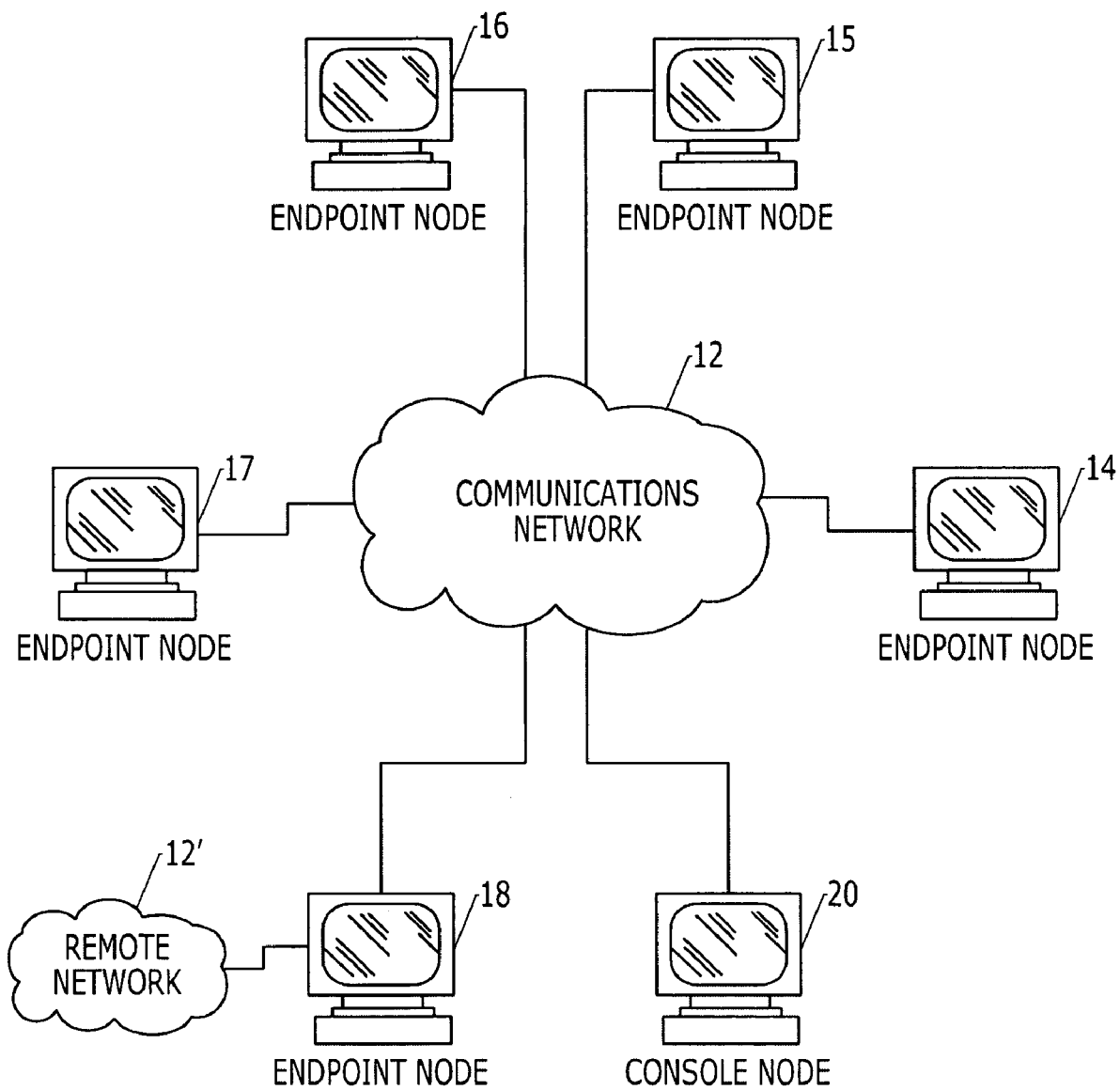
FIG. 1 is a block diagram of a hardware and software environment in which the present invention may operate according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Embodiments of the present invention will now be described with respect to FIGS. 1 through 17 below. Embodiments of the present invention provide methods, systems and computer program products for evaluating performance of a network that supports packetized communications. A network impairment indicator may be generated for each of a plurality of quality factors including, but not limited to, a delay factor, a jitter factor, a lost data factor and/or a codec selection factor. The network impairment indicator may be generated based on the results of a network performance test using a network test protocol. The network impairment indicator provides an indication of the degree that each of the quality factors influences the degradation of the overall network quality, for example, overall call quality for a network that supports packetized voice communications. This information may enable users to identify the major problems in existing or future networks and, therefore, allow for more specific troubleshooting.

Furthermore, embodiments of the present invention may provide a result summary providing a synopsis of the results of the network performance test. The result summary may include, but is not limited to, an indication of overall network quality using a series of quality thresholds. The summary may be provided in a format, for example, a text format, that may be displayed on a computer screen or printed on a printer and/or photocopier. These result summaries or reports may provide a simplified method of explaining and summarizing the results of a network performance test.

Referring first to FIG. 1, embodiments of packetized communications systems according to the present invention will be further described. A hardware and software environment in which the present invention can operate as shown in FIG. 1 will now be described. As shown in FIG. 1, the present invention includes methods, systems and computer program products for assessing the quality of a communications network 12. Communications network 12 provides a communication link between the endpoint nodes 14, 15, 16, 17, 18 supporting, for example, packetized voice and/or video communications, and further provides a communication link between the endpoint nodes 14, 15, 16, 17, 18 and the console node 20.

As will be understood by those having skill in the art, a communications network 12 may include of a plurality of separate linked physical communication networks, which, using a protocol such as the Internet protocol (IP), may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17. It is further to be understood that, while for illustration purposes in FIG. 1 communications network 12 is shown as a single network, it may be comprised of a plurality of separate interconnected physical networks. As illustrated in FIG. 1, endpoint nodes 14, 15, 16, 17, 18 may reside on a computer. As illustrated by endpoint node 18, a single computer may comprise multiple endpoint nodes for use in multiple networks (12, 12').

Performance evaluation of a network according to embodiments of the present invention as illustrated in FIG. 1 may further include a designated console node 20. The present invention evaluates the performance of communications network 12 by the controlled execution of network traffic, for example, packetized voice and/or video type communication traffic between the various endpoint nodes 14, 15, 16, 17, 18 on the communications network 12. It will be understood that network traffic may be simulated by endpoint node pairs or the console node 20 may perform as an endpoint node for purposes of a performance test/evaluation. It will also be understood that any endpoint node may be associated with a plurality of additional endpoint nodes to define a plurality of endpoint node pairs.

Console node 20, or other means for controlling testing of network 12, obtains user input, for example, by keyed input to a computer terminal or through a passive monitor, to determine a desired test. Console node 20, or other control means further defines a test scenario to emulate/simulate network traffic between a plurality of selected endpoint nodes 14, 15, 16, 17, 18. Each endpoint node 14, 15, 16, 17, 18 may be provided endpoint node information, including an endpoint node specific network test protocol based on the network traffic expected, to provide a test scenario which simulates/emulates actual network traffic. Console node 20 may construct the test scenario, including the underlying test protocols, and console node 20, or other initiating means, may initiate execution of network test protocols for evaluating network performance.

Test protocols may contain all of the information about a performance test including which endpoint nodes, for example, endpoint nodes, 14, 15, 16, 17, 18 to use, what test protocol and/or network protocol to use for communications between each pair of the endpoint nodes, what call script to use and the like. The test protocol script for a test protocol may have user configurable aspects, such as which codec to use, the size of a speech/video packet, a level of quality of service (QoS) to be met, the number of concurrent calls to allow during execution of the test protocol, a delay between packets and the like. A given network performance test may utilize a single test protocol for the total duration of the test or may utilize a plurality of different test protocol scripts.

The console node 20 may also generate an overall network quality rating for the network 12. The overall network quality rating may represent, for example, the overall call quality and/or video quality of the network. The overall network quality rating may be used by the user/customer to determine if a particular network is ready to handle a particular type of traffic, for example, voice or video. The console node 20 may further generate a network impairment indicator based on network performance data. If, for example, the overall network quality rating of the network 12 is unsatisfactory to the user/customer, the network impairment indicator may identify the major problem areas in the network. This information may be used by the user/customer to correct the problems and produce a network 12 having an acceptable overall network quality rating.

Figure 2:
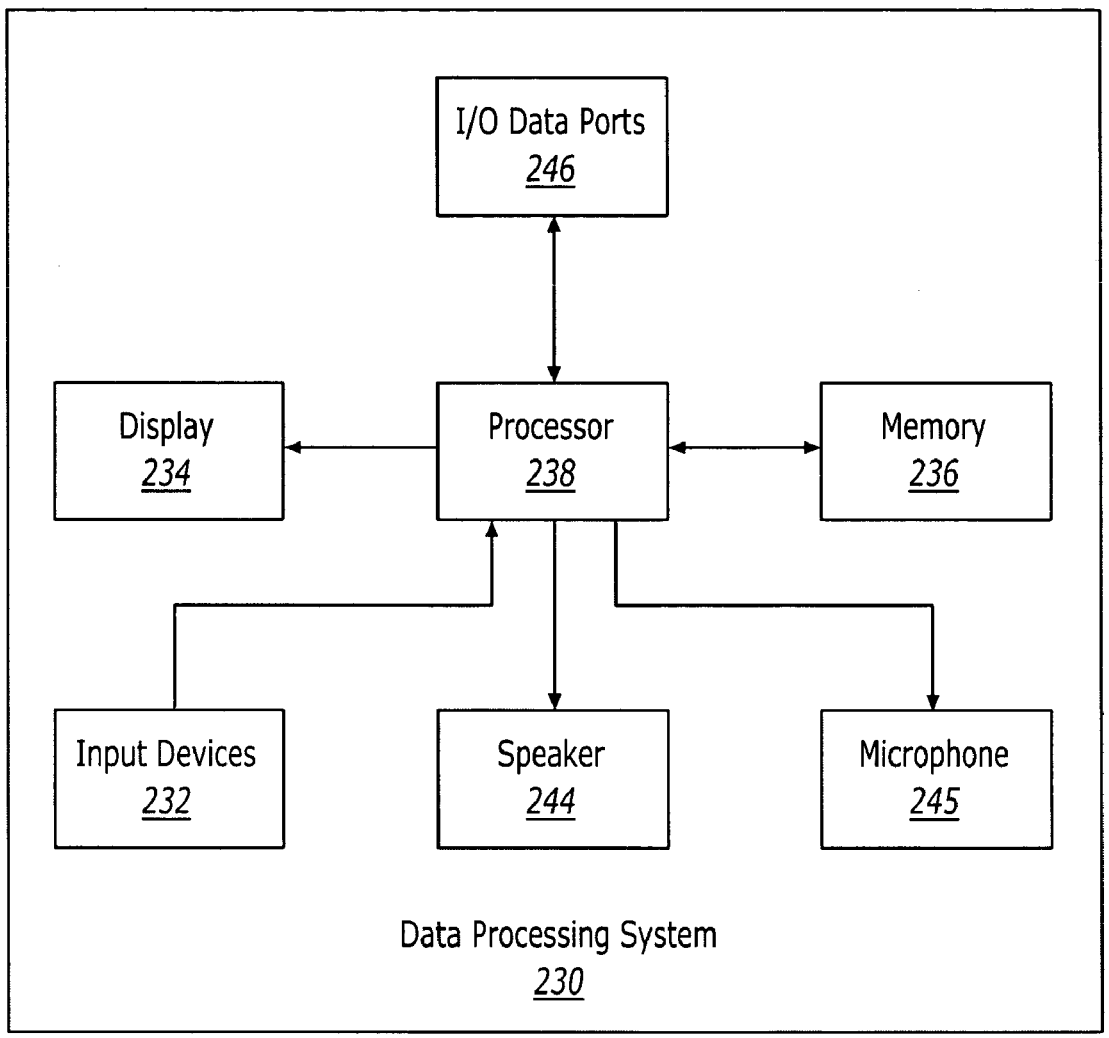
FIG. 2 is a block diagram of a data processing system according to embodiments of the present invention.

FIG. 2 illustrates an exemplary embodiment of a data processing system 230 in accordance with embodiments of the present invention. The data processing system 230 typically includes input device(s) 232 such as a keyboard or keypad, a display 234, and a memory 236 that communicate with a processor 238. The data processing system 230 may further include a speaker 244, a microphone 245 and I/O data port(s) 246 that also communicate with the processor 238. The I/O data ports 246 can be used to transfer information between the data processing system 230 and another computer system or a network 12, for example, using an internet protocol (IP) connection. These components may be conventional components such as those used in many conventional data processing systems which may be configured to operate as described herein.

Figure 3:
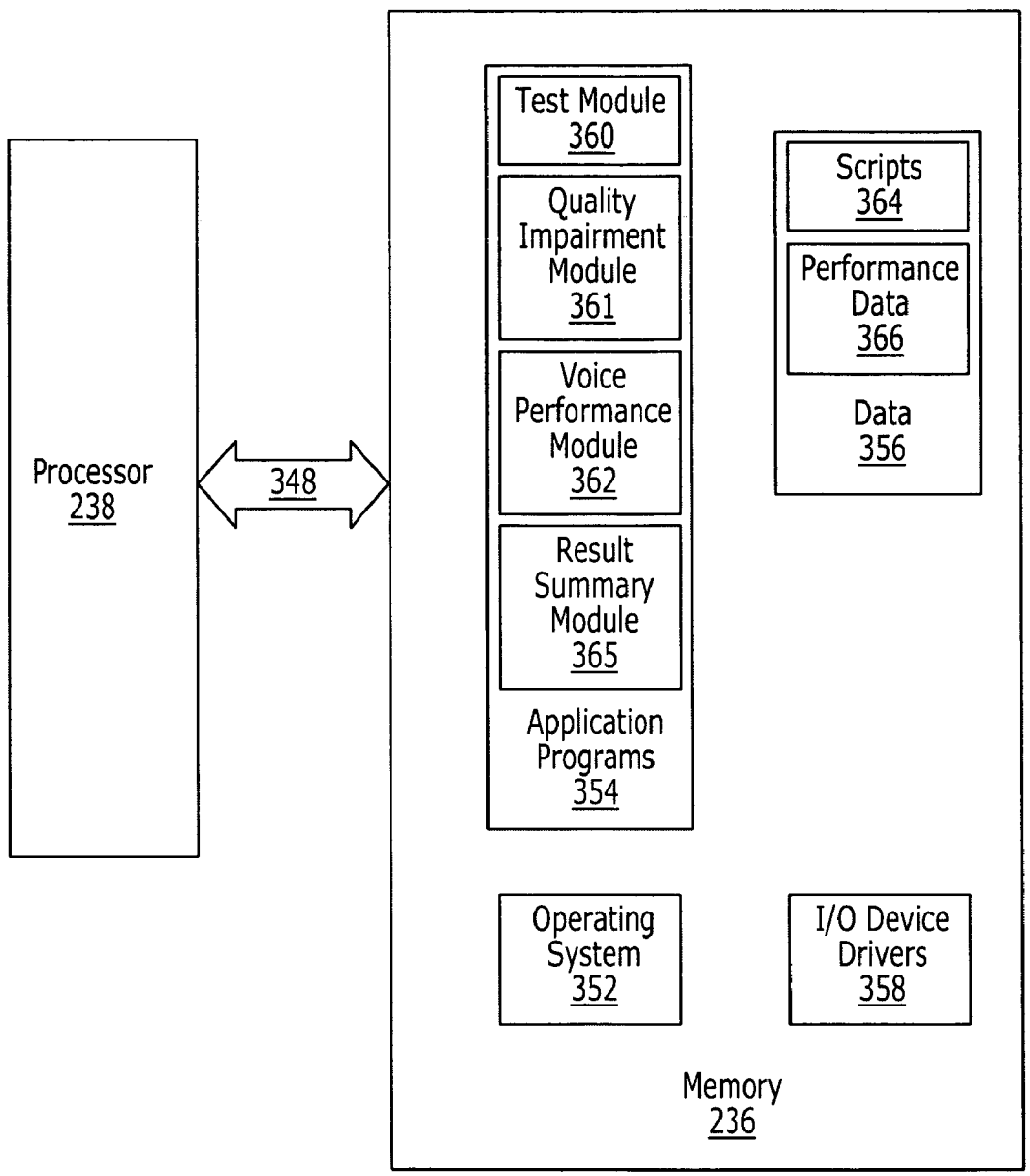
FIG. 3 is a more detailed block diagram of data processing systems implementing a control and/or an endpoint node according to embodiments of the present invention.

FIG. 3 is a block diagram of embodiments of data processing systems that illustrate methods, systems and computer program products for evaluating performance of a network that supports packetized communications in accordance with embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows2000 from Microsoft Corporation, Redmond, Wash., Unix or Linux. The I/O device drivers 358 typically include software routines accessed through the operating system 352 by the application programs 354 to communicate with devices such as the input devices 232, the display 234, the speaker 244, the microphone 245, the I/O data port(s) 246, and certain memory 236 components. The application programs 354 are illustrative of the programs that implement the various features of the data processing system 230 and preferably include at least one application that supports operations according to embodiments of the present invention. Finally, the data 356 represents the static and dynamic data used by the application programs 354, the operating system 352, the I/O device drivers 358, and other software programs that may reside in the memory 236.

Note that while the present invention may be described herein generally with reference to packetized voice communication networks, for example, VoIP communications, the present invention is not so limited. Thus, it will be understood that the present invention may be utilized to evaluate networks supporting any type of data streams, for example, transmission control protocol (TCP) applications, web service applications, and/or any audio or video applications.

It will be understood that FIG. 3 illustrates a block diagram of data processing systems implementing a control and/or an endpoint node according to embodiments of the present invention. Thus, the application programs 354 and the data 356 discussed with respect to FIG. 3 may be located in the console node device, the enpoint node device or both. The application programs 354 in a node device may include a test module 360 that transmits a request to initiate execution of a network test protocol to a plurality of endpoint nodes connected to a network to be evaluated. The request may be transmitted through the I/O data ports 246, which provide a means for transmitting the request and also provide a receiver that receives, for example, over the network 12, obtained performance data 366 from the endpoint nodes based on the initiated network test protocol. Thus, in various embodiments of the present invention, the request to initiate a test as well as the reported obtained performance data may be communicated between node devices. The test module 360 may be further configured obtain the network performance data and generate an overall network quality rating based on the obtained performance data. The test module may further be configured to generate a network impairment indicator based on the overall network quality rating as discussed above. The details of embodiments of the test module and its functionality suitable for use in the present invention are discussed in commonly assigned U.S. patent application Ser. No. 09/951,050 entitled Methods, Systems and Computer Program Products for Packetized Voice Network Evaluation, which is hereby incorporated herein by reference as if set forth herein in its entirety.

As illustrated in FIG. 3, the application programs in a node device may also include a quality impairment module 361 and a result summary module 365. The quality impairment module 361 may be configured to calculate a network impairment indicator for each of a plurality of quality factors, for example, a delay factor, a lost data factor, a jitter factor, and/or a codec selection factor. The network impairment indicator for each of the quality factors may be calculated based on the overall network quality rating. The result summary module 365 may be configured to generate a result summary (or report) of the results of the network performance test using the network test protocol. The result summary may indicate a summary of the overall network quality rating using a plurality of thresholds, for example, good, acceptable and/or poor (GAP). These quality thresholds may be configured by the user. The result summary may further provide a visual indication of the network impairment indicators. In some embodiments of the present invention, the network impairment indicators may be represented as network impairment ratios. Theses network impairment ratios may be generated by the quality impairment module 361 as will be discussed below. The result summary module 365 may be further configured to generate a chart indicating the network impairment ratios for each of the quality factors.

As is also shown in FIG. 3, the application programs 354 in a node device 20 may further include a voice performance characterization module 362 that maps the obtained performance data to terms of an overall network quality rating as will be discussed below with respect to FIG. 4. The voice performance characterization module 362 may also generate the overall network quality rating, in contrast to the test module 360, based on the mapped obtained performance data.

Additional aspects of the data 356 in accordance with embodiments of the present invention are also illustrated in FIG. 3. As shown in FIG. 3, the data 356 includes scripts 364 which may be used in defining a network test protocol for a test of the network. As discussed above, the scripts 364 may be configured by the user. For example, the user may choose which codec to use. The user may also select, for example, a QoS, a jitter buffer and/or turn silence suppression on or off. One or more scripts may be provided to emulate, for example, packetized voice communications, such as VoIP communications, by generating network traffic between selected endpoint nodes 14, 15, 16, 17, 18 of the network as specified by the network test protocol, which may be initiated at selected intervals by the console node device 20. For VoIP communications, a call script may be created such that the simulated traffic corresponds to an existing IP phone protocol.

The data 356 included in a node device may further include performance data 366 according to embodiments of the present invention. The performance data may include stored measurement values. In various embodiments of the present invention, the stored measurement values (timing records) may be stored, for example, as a one-way delay measurement for particular ones of, for example, the emulated voice packets transmitted during the tests. The data may also be stored in a more processed form, such as averages. Furthermore, the data may be processed further to generate the one-way delay measurements or other measurements which are to be directly mapped into terms of the overall network quality rating and then stored in the processed form. Alternatively, the conversion into the obtained performance data format suitable for mapping to terms of the overall network quality rating may be performed at the console node 20 based on raw data reported from ones of the endpoint nodes 14, 15, 16, 17, 18 participating in a network test protocol execution event. It will be understood that the performance data may be obtained on an endpoint pair basis. The performance data may also be obtained from devices on the network, for example, routers and switches. This data may be obtained from the network devices, for example, by simple network management protocol (SNMP) polling. The details of embodiments for obtaining and calculating the stored measurement values suitable for use with the present invention are discussed further in commonly assigned U.S. patent application Ser. No. 09/951,050 entitled Methods, Systems and Computer Program Products for Packetized Voice Network Evaluation.

The voice performance characterization module 362 shown in FIG. 3 may be configured to generate terms such as a delay impairment term ($I_d$) of an overall network quality rating, such as an R-value, based on the one-way delay measurements received from one or more endpoint node devices. In other words, either the test module 360 and/or the voice performance module 362 may be configured to generate the one-way delay measurements based on obtained timing information from communicated packets during an executed network test protocol.

While the present invention is illustrated, for example, with reference to the voice performance characterization module 362 being an application program in FIG. 3, as will be appreciated by those of skill in the art, other configurations may also be utilized while still benefiting from the teachings of the present invention. For example, the voice performance characterization module 362 and/or the test module 360 may also be incorporated into the operating system 352 or other such logical division of the data processing system 230. Thus, the present invention should not be construed as limited to the configuration of FIG. 3 but is intended to encompass any configuration capable of carrying out the operations described herein.

As noted in the background section above, it is known to generate an estimated Mean Opinion Score (MOS) to characterize user satisfaction with a voice connection in a subjective manner as described in the ITU-T recommendation P.800 available from the International Telecommunication Union. It is further known to extend from this subjective rating system to the E-model specified in ITU-T recommendation G.108 also available from the International Telecommunication Union to generate an R-value to mathematically characterize performance of a voice communication connection in a network environment. Further information related to the E-model of voice communication performance characterization is provided in draft TS1101329-5 v0.2.6 entitled Telecommunications and Internet Protocol Harmonization Over Networks (IPHON), Part 5: Quality of Service (QoS) Measurement Methodologies" available from the European Telecommunications Standards Institute.

Figure 4:
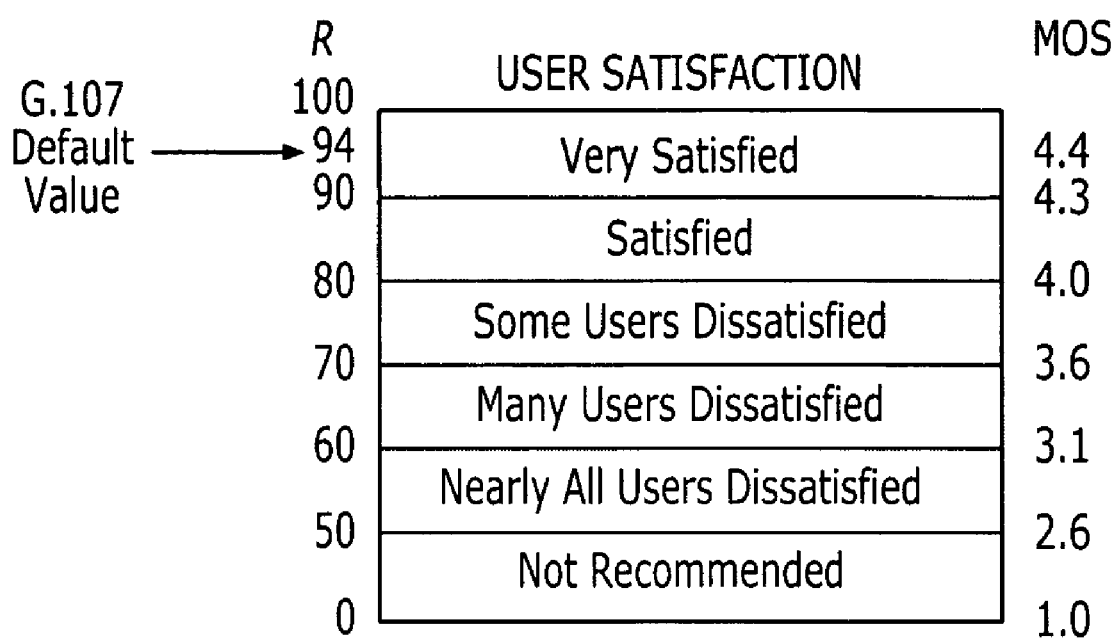
FIG. 4 is a graphical illustration of a mapping of an R-value to an estimated Mean Opinion Score (MOS) suitable for use with embodiments of the present invention.

An overall transmission quality rating, such as the R-value, may further be used to estimate a subjective performance characterization, such as the MOS, as illustrated in FIG. 4. Thus, the calculated R-values ranging from 0 to 100 may be mapped to the MOS ratings from 1 to 4.5 such as by the illustrated mapping in FIG. 4. The present inventors have recognized that such voice communication characterization tools may be utilized in a manner that may provide detailed information with respect to the quality factors that influence degradation of the overall network quality rating. This detailed information may be provided, for example, to network developers and used to improve the overall network quality rating of existing and future networks.

The approach of the present invention is not limited solely to networks which are actively carrying, for example, packetized voice and/or video communications but may also be utilized to assess the readiness and expected performance level for a network that is configured to support such packetized voice and/or video communications before they are introduced to the network. Thus, the present invention may be used not only to track performance of a network on an on-going basis but may also be utilized to assess a network before deploying packetized voice and/or video communications on the network and may even be used to upgrade, tune or reconfigure such a network before allowing users access to packetized voice and/or video communications capabilities. In particular, the network impairment indicators for each of a plurality of quality factors may be used to identify problems in the network and allow for more localized troubleshooting. The result of subsequent changes to the network which may be provided in support of voice communications or for other data communication demands of a network may also be assessed to determine their impact on voice and/or video communications in advance of or after such a change is implemented.

Before describing the present invention further and by way of background, further information on one particular overall performance measure, the R-value will now be further described.

The E-model R-value equation is expressed as:

$$R_{ACTUAL} = R_0 - I_s - I_d - I_e + A \quad (1)$$

where $R_0$ is the basic signal to noise ratio ("the signal"); $I_s$ is the simultaneous impairments; Id is the delay impairments; $I_e$ is the equipment impairments; and A is the access advantage factor. It will be understood that this e-model is known to those of skill in the art and should not be confused with embodiments of the present invention. As discussed above, R may be mapped to an estimated MOS. For example, a range of R from $0 \leq R \leq 93.2$ may be mapped to a range of MOS from $1 \leq MOS \leq 4.5$.

As will be further described, in accordance with the present invention, some of the terms used in generating the R-value may be held constant while others may be affected by obtained performance data from an executed network test protocol. For example, $R_0$ may be held constant across a plurality of different test protocol executions on a network at a value set on a base reference level or initially established based on some understanding of the noise characteristics of the network to be tested. Similarly, the access advantage factor (A) will typically be set as a constant value across multiple network test protocol executions. In contrast, the delay impairment ($I_d$) and the equipment impairments ($I_e$) may be affected by the measured results in each execution of a network test protocol to objectively track network packetized voice communication performance capabilities over time.

The delay impairment factor ($I_d$) may be based on number of different measures. These measures may include the one-way delay as measured during a test, packetization delay and jitter buffer delay. The packetization delay may be readily modeled as a constant value in advance based upon the associated application software utilized to support packetized voice network communications. The jitter buffer delay may also be modeled as a constant value or based on an adaptive, but known, jitter buffer delay value if such is provided by the voice communication software implementing the jitter buffer feature. In accordance with various embodiments of the present invention, the packetization delay may take on different predetermined values based upon the codec used for a particular communication. It is known that different hardware codec devices have different delay characteristics. Exemplary packetization delay values suitable for use with the present invention may include 1.0 milliseconds (ms) for a G.711 codec, 25.0 ms for a G.729 codec and 67.5 ms for a G.723 codec.

The equipment impairment factor ($I_e$) is also typically affected by the selected codec. It will be understood by those of skill in the art that different codecs provide variable performance and that the selection of a given codec generally implies that a given level of quality is to be expected. Exemplary codec impairment values are provided in Table 1:

TABLE 1

Codec Comparison

| Codec | Bit Rate (kbps) | Payload Size (bytes) | Default Codec Impairment | Packetization Delay Values (ms) | Achievable MOS value |
|---|---|---|---|---|---|
| G.711 | 64.0 | 240 | 0 | 1.0 | 4.41 |
| G.729 | 8.0 | 30 | 11 | 25.0 | 4.07 |
| G.723m | 6.3 | 24 | 15 | 67.5 | 3.88 |
| G.723a | 5.3 | 20 | 19 | 67.5 | 3.70 | where the Default Codec Impairment in Table 1 is based on ITU G.113, appendix 1.

The equipment impairment factor ($I_e$) may also be affected by the percent of packet loss and may further be affected by the nature of the packet loss. For example, packet loss may be characterized as bursty, as contrasted with random, where bursty loss refers to the number of consecutive lost packets. For example, where N is the consecutive lost packet count, N greater than or equal to X may be characterized as a bursty loss while lower consecutive numbers of packets lost may be characterized as random packet loss and included in a count of all, including non-consecutive and consecutive packets lost. X may be set to a desired value, such as 5, to characterize and discriminate bursty packet loss from random packet loss. Note that the equipment impairment factor ($I_e$) is further documented in ITU G.113 and G.113/APP1 which are also available from the International Telecommunication Union.

Thus, in various embodiments of the present invention, some characteristics, such as the codec, jitter buffer characteristics, silence suppression features or other known aspects may be specified in advance in a script as discussed above and modeled based on the specified values while data, such as one-way delay, packet loss and jitter, may be measured during execution of the network test protocol. These measurements may be made between any two endpoints in the network configured to operate as endpoint nodes and support such tests and may be concurrently evaluated utilizing a plurality of endpoint pairs for the communications and measurements. This measured and pre-characterized information may, in turn, be used to generate an overall network quality rating, such as an R-value. The overall network quality rating may be used to calculate a network impairment indicator and/or ratio for each of the measured pieces of information, i.e. quality factors, and the selected codec.

The availability of the network impairment indicator may provide a methodology for determining the quality of network performance, for example, to identify whether a problem exists for a particular type of traffic and what quality factor is contributing most to the problem. Thus, the impact on the overall network quality of a communication, as affected by the various quality factors, may be assessed using various embodiments of the present invention.

Figure 5:
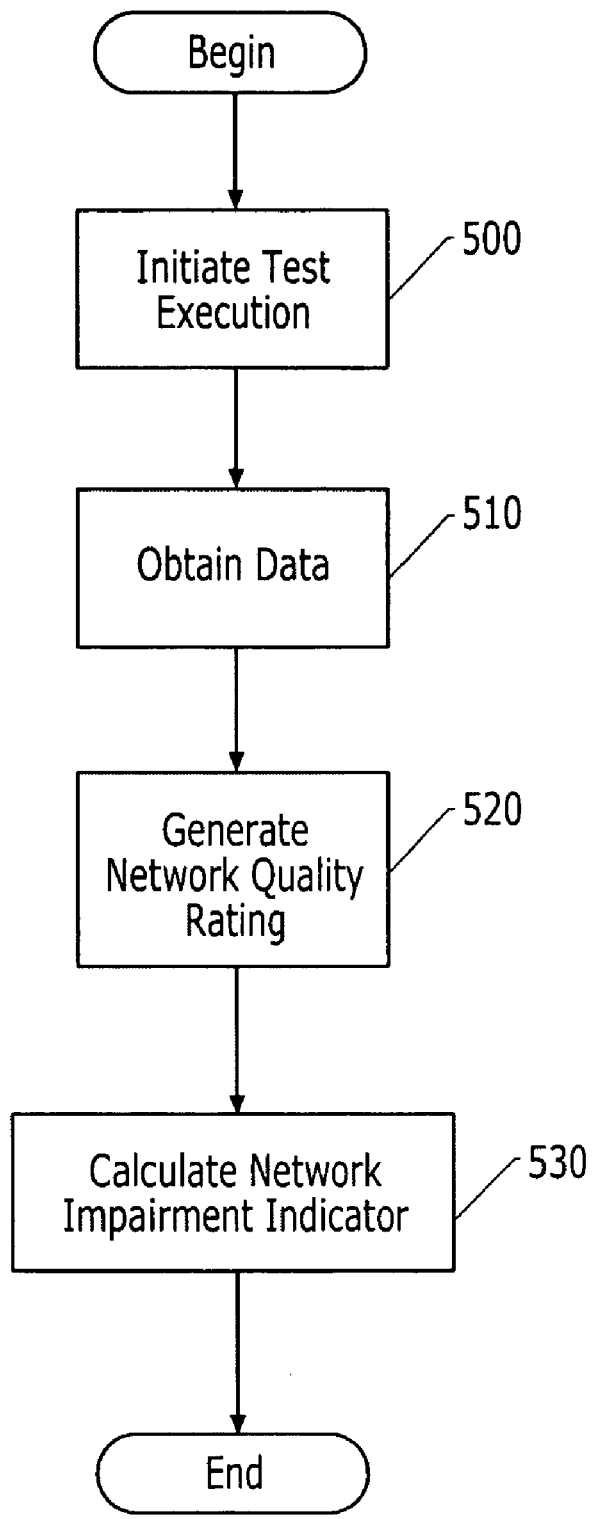
FIG. 5 is a flow chart illustrating operations for assessing a network according to embodiments of the present invention.

Referring now to the flowchart diagram of FIG. 5, operations for evaluating performance of a network that supports packetized communications will be further described for various embodiments of the present invention. As shown in FIG. 5, operations begin at block 500 by initiating execution of a network test protocol associated with the packetized communication. The packetized communication may be, for example, packetized voice communication and/or packetized video communication. The network test protocol may be "associated" with the packetized communication because the network test protocol may be configured to simulate actual voice and/or video traffic. The performance of the network with respect to the simulated traffic may be evaluated to determine if the existing or future network can support the simulated type of traffic. Network performance data may be obtained based on the initiated network test protocol (block 510). Network performance data may include both raw data and calculated data, such as measured one-way delay and an average one-way delay. An overall network quality rating is generated based on the obtained performance data (block 520). In a network that supports packetized voice communications, the overall network quality rating may be, for example, an overall call quality rating. The overall call quality rating may be expressed in the form of, for example, an R-Value or MOS value. If it is expressed in the form of an R-Value, the R-Value may be mapped into a MOS value as discussed above with respect to FIG. 4. Details of embodiments of the network test protocol, obtaining network performance data and the overall network quality rating suitable for use with the present invention are discussed further in commonly assigned U.S. patent application Ser. No. 09/951,050 entitled Methods, Systems and Computer Program Products for Packetized Voice Network Evaluation.

A network impairment indicator is calculated based on the overall network quality rating (block 530). A network impairment indicator may be generated for a plurality of quality factors. In a network that supports packetized voice communications, these quality factors may include, but are not limited to, a delay factor, a jitter factor, a lost data factor and/or a codec selection factor. These quality factors may influence the degradation of the overall network quality rating, for example, the overall call quality rating. For example, if a network that supports packetized voice communications has a very large delay, the delay factor may have a significant influence on the overall call quality of the network.

As used herein, the term "network impairment indicator" will be used to signify the contribution of the quality factors to the impairment of the overall quality of the network. Thus, for example, a delay impairment indicator will signify the contribution of the delay quality factor to the impairment of the overall quality of the network. Similarly, there is a jitter impairment indicator corresponding to the jitter quality factor, a lost data impairment indicator corresponding to a lost data quality factor, and a codec impairment indicator corresponding to the codec selection quality factor. It will be understood that these impairment indicators/quality factors are provided herein for exemplary purposes only and, therefore, the present invention is not limited to the impairment indicators/quality factors described herein. The network impairment indicators may provide the capability of identifying the significant problem areas in the network and may give rise to an improved overall network quality rating.

Figure 6:
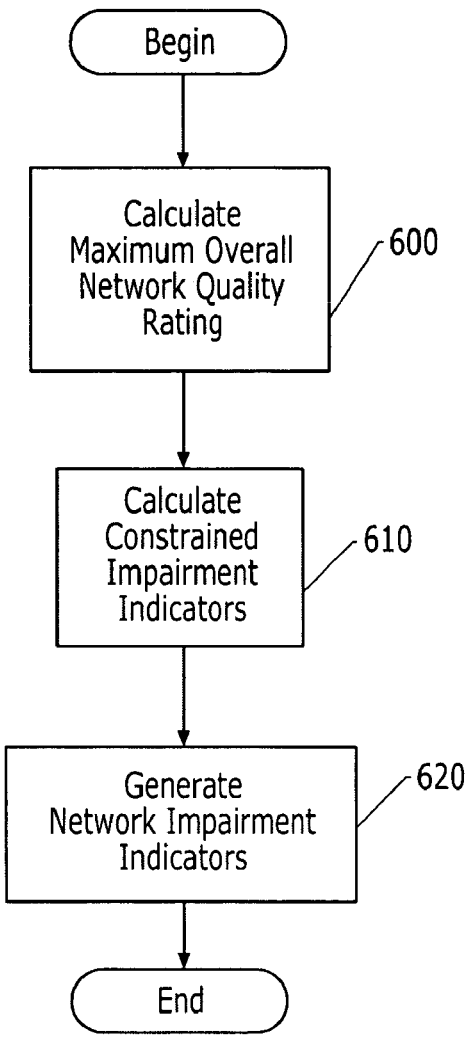
FIG. 6 is a flow chart illustrating operations for calculating impairment indicators according to embodiments of the present invention.

Referring now to the flowchart diagram of FIG. 6, operations for calculating network impairment indicators will be further described for various embodiments of the present invention. A maximum overall network quality rating may be calculated for the network or a particular executed network test protocol (block 600). This calculation assumes that the network being tested has no impairments, i.e. no delay, no lost data and the like. A codec having no impairments may be used for this calculation, for example, codec G.711. It will be understood that the maximum overall network quality rating may be limited by the equipment impairments. For example, the codec or codecs selected for the network performance test may influence the overall network quality rating.

This maximum overall quality rating may be calculated and/or expressed as, for example, an R-Value or MOS value. It will be understood that the calculation may be carried out using, for example, R-Values, and the final overall network quality rating may be converted to a MOS value. In this situation, for purposes of calculating network impairment indicators according to embodiments of the present invention, the E-model calculates a maximum R-Value using the following formula:

$$R_{MAX} = R_o - I_s - I_d - I_e + A,$$

where $R_o$ is the basic signal-to-noise ratio. In other words, $R_o$ is the base amount of signal, which becomes impaired by a variety of factors. $I_s$ is the simultaneous impairments term. $I_s$ is fixed with respect to the calculations discussed herein. $I_d$ is the delay impairments term. $I_e$ is the equipment impairment term and is codec-based. A is the access expectation term and is fixed with respect to calculations discussed herein.

A maximum overall network quality rating may be expressed as a maximum R-value for the network test protocol (block 600). In particular, the maximum theoretical R-value ($R_{MAX}$) for the E-model above is calculated by assuming that the network being tested has no impairments, i.e. no delay and no lost data. This corresponds to a maximum R-Value of 93.2 (block 600). This corresponds to a Mean Opinion Score (MOS) of 4.41, which is calculated as discussed above with respect to FIG. 4. It will be understood that this maximum R-Value is provided for exemplary purposes only and that maximum overall network quality ratings according to embodiments of the present invention are not limited by this example.

Constrained network impairment indicators may be calculated for the quality factors (block 610). In other words, embodiments of the present invention may include a codec selection constrained impairment indicator, a delay constrained impairment indicator, a lost data constrained impairment indicator and a jitter constrained impairment indicator. These network impairment indicators are termed "constrained" because they may be calculated using obtained performance data and/or assumptions for certain network criteria. For example, the codec selection constrained impairment indicator may be calculated based on a measured/obtained (actual) codec packetization delay and an assumed data loss of zero percent.

A network impairment indicator may be generated for the plurality of quality factors based on the maximum overall network quality rating and the calculated constrained network impairment indicators for the quality factors (block 620). It will be understood that there may be one or more constrained network impairment indicators based on the number of data points collected during execution of the network test protocol as will be discussed further below.

As discussed above, a network performance test using a particular network test protocol may be performed for an endpoint pair. An endpoint pair typically includes a first endpoint and a second endpoint. In packetized communications systems, data flows in two different directions simultaneously. The first flow direction may be from the first endpoint to the second endpoint and the second flow direction may be from the second endpoint to the first endpoint, or visa versa. During execution of the network test protocol data is collected for each of the flow directions and maintained in a plurality of timing records. In other words, a new timing record is created each time data is collected. A timing record may be part of and stored as the network performance data discussed above with respect to FIG. 3. Data may be collected and stored in timing records frequently for each of the first and second flow directions during execution of the network test protocol. Data may be, for example, collected and stored about every 5 seconds. Thus, when the network performance test is completed, there are typically a large number of timing records.

Figure 7:
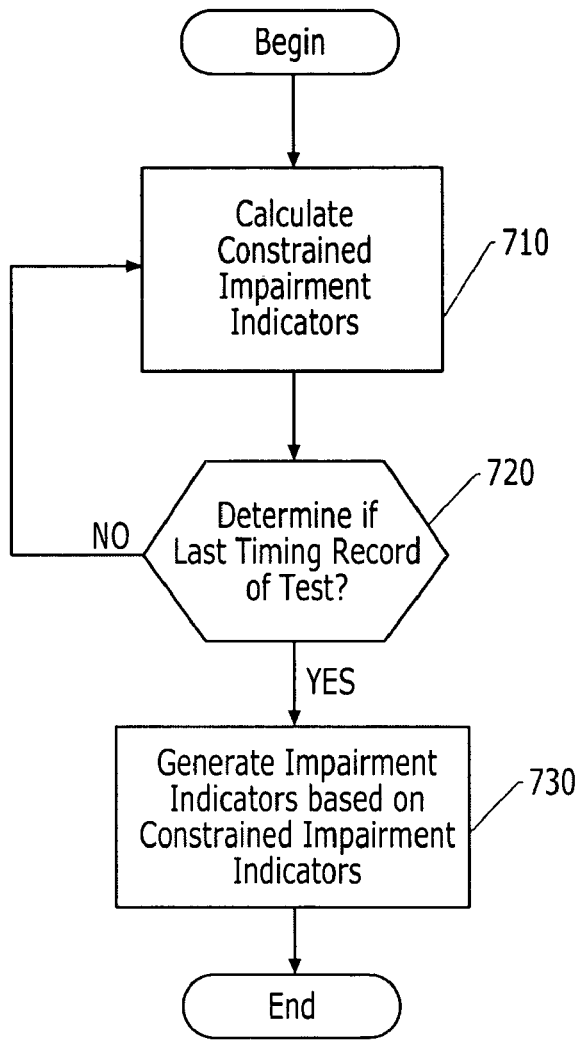
FIG. 7 is a flow chart illustrating operations for calculating constrained impairment indicators according to embodiments of the present invention.

Referring now to FIG. 7, operations for calculating constrained impairment indicators according to embodiments of the present invention will be discussed. According to embodiments of the present invention, a plurality of constrained impairment indicators corresponding to the respective timing records collected during execution of the network test protocol may be calculated for of the quality factors, i.e. the delay factor, the jitter factor, the lost data factor and/or the codec selection factor discussed above (block 710). In other words, for one or more timing records collected during the network performance test, a constrained impairment indicator may be calculated for all or selected ones of the quality factors. Accordingly, a codec selection constrained impairment indicator, a delay constrained impairment indicator, a lost data constrained impairment indicator and a jitter constrained impairment indicator may be calculated for all or a selected number of the timing records.

For example, for embodiments of the present invention utilizing R-Values, a constrained impairment indicator may be calculated in the form of an R-value for the quality factors based on the obtained performance data stored in the corresponding timing records (block 710). For example, the codec selection constrained impairment indicator may be calculated for each timing record as follows:

Codec Selection Constrained Impairment
Indicator=$R_{MAX}-(R_C=R_o-I_s-I_d^C-I_e^C+A)$, where the delay impairments term ($I_d$) for purposes of this calculation includes the codec packetization delay ($I_d^C$) and the equipment impairment term ($I_e$) for this calculation includes the codec impairment calculated assuming a zero percent data loss ($I_e^C$). It will be understood that the codec packetization delay ($I_d^C$) may be taken into account with respect to the calculation of the codec selection constrained impairment indicator as illustrated above. The codec packetization delay ($I_d^C$) may also be taken into account with respect to the calculation of the delay constrained impairment indicator as discussed below either in addition to the calculation of the codec selection constrained impairment indicator or instead of including it in the calculation of the codec selection constrained impairment indicator.

By way of further example, the delay constrained impairment indicator may be calculated as follows:

Delay Constrained Impairment Indicator=$R_{MAX}$-codec selection constrained impairment indicator-$(R_D=R_o-I_s-I_d^D-I_e^D+A)$, where the delay impairment term ($I_d$) for this calculation includes the sum of the codec packetization delay, a network delay, a jitter buffer delay and any additional network delay ($I_d^D$) and the equipment impairment term ($I_e$) for this calculation is the codec impairment calculated assuming a zero percent data loss ($I_e^C=I_e^D$).

By way of further example, the lost data constrained impairment indicator and jitter constrained impairment indicator may be calculated based on an overall lost packet constrained impairment indicator. The overall lost packet constrained impairment indicator may be calculated as follows:

Overall Lost Packet Constrained Impairment Indicator=$R_{MAX}$-codec selection constrained impairment indicator-delay constrained impairment indicator-$(R_{OLP}=R_o-I_s-I_d-I_e^{OLP}+A)$, where the equipment impairment term ($I_e$) for this calculation is the codec impairment calculated using an overall percentage data loss ($I_e^{OLP}$). The overall percentage data loss may be made up of different network losses, for example, a network percentage data loss and a jitter percentage data loss. The network percentage data loss may represent the number of packets (percentage of packets) that were sent, but did not arrive at a destination. The jitter percentage data loss may represent the number of packets (percentage of packets) that arrived at a receiver but were discarded because the jitter buffer did not have any available capacity.

Accordingly, the lost data constrained impairment indicator may be calculated as follows:

Lost Data Constrained Impairment Indicator = (network percentage data loss/overall percentage data loss) ∗ Overall Lost Packet Constrained Impairment Indicator.

Similarly, the jitter constrained impairment indicator may be calculated as follows:

Jitter Constrained Impairment Indicator = (Jitter percentage data loss/overall percentage data loss) ∗ Overall Lost Packet Constrained Impairment Indicator.

It will be understood that the overall percentage data loss may include more losses than the network percentage data loss and the jitter percentage data loss. The losses provided herein are provided for exemplary purposes only.

It will also be understood that although the quality factors discussed specifically herein are the jitter factor, the delay factor, the lost data factor and the codec selection factor, the present invention is not limited to these quality factors. Many other quality factors may be included herein without departing from the teachings of the present invention.

It is determined after calculating the constrained impairment indicators for the quality factors for a single timing record if there are any other timing records for the particular network performance test (block 720). If more timing records are present, operations according to block 710 repeat until no more timing records are present. If it is determined that no more timing records are present (block 720), the network impairment indicators for selected ones of the quality factors is generated based on the constrained impairment indicators (block 730). For example, an average of the constrained impairment indicators for the quality factors may be generated to produce a single network impairment indicator for each or selected ones of the quality factors as discussed above. Thus, the network impairment indicator for a quality factor may be represented by the average of the constrained impairment indicator for the corresponding quality factor in some embodiments of the present invention. Although averaging the constrained network impairment indicators is provided herein as a method of calculating the network impairment indicators, the present invention is not limited to this method. In some embodiments of the present invention, the network impairment indicators may be represented by a mean of the constrained network impairment indicators.

In further embodiments of the present invention, a network impairment indicator for the quality factors may be generated with respect to flow direction. Accordingly, a first flow direction network impairment indicator and a second flow direction network impairment indicator may be generated based on a first flow direction constrained impairment indicator and a second flow direction constrained impairment indicator, respectively. For example, the constrained impairment indicators for selected ones of the quality factors may be averaged with respect to flow direction, thus producing a network impairment indicator for each of the quality factors for each flow direction. The network impairment indicators for the quality factors for each flow direction may be averaged to produce a single network impairment indicator for the quality factors.

Figure 8:
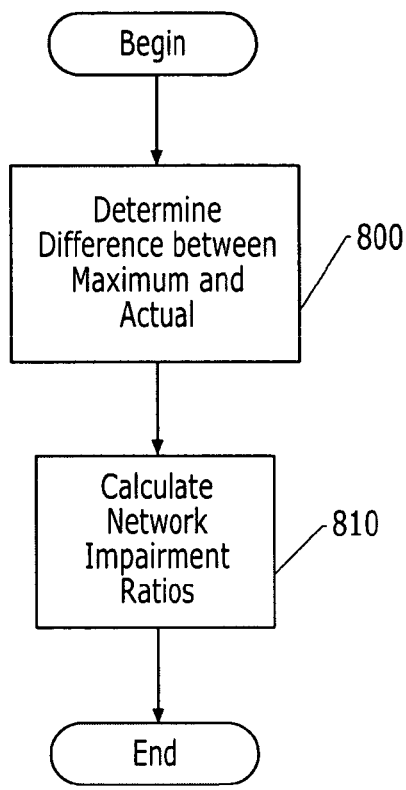
FIG. 8 is a flow chart illustrating operations for calculating network impairment ratios according to embodiments of the present invention.

Referring now to the flowchart diagram of FIG. 8, operations for calculating network impairment ratios according to embodiments of the present invention will be described for various embodiments of the present invention. In a network that supports packetized voice communications, the overall call quality rating discussed above may be the actual overall call quality rating. A difference between the maximum overall call quality rating and the actual overall call quality rating may be determined for a particular network or endpoint pair with respect to a particular network test protocol (block 800). As discussed above, the maximum overall call quality rating and the actual overall call quality rating may be represented as, for example, an R-Value or a MOS value.

A network impairment ratio for the quality factors may be calculated based on the difference between the maximum overall call quality rating and the actual overall call quality rating and respective ones of the network impairment indicators (block 810). The network impairment ratios for the quality factors are a fractional representation of the network impairment indicators for each of the quality factors. Accordingly, the network impairment ratios corresponding to respective ones of the network impairment indicators may be calculated by dividing the plurality of network impairment indicators for the plurality of quality factors by the difference between the maximum overall call quality rating and the actual overall call quality rating. The network impairment ratios may be, for example, represented as a percentage that indicates the influence of the particular quality factor on the degradation of the overall call quality.

For example, if the maximum overall call quality rating and the actual overall call quality rating are represented as R-Values, a difference between the maximum R-Value and the actual R-Value may be determined for each of the plurality of quality factors (block 800). A network impairment ratio for each of quality factors may calculated based on the difference between the maximum R-Value and the actual R-Value and respective ones of the network impairment indicators (block 810). Accordingly, the network impairment ratios corresponding to respective ones of the network impairment indicators may be calculated by dividing the plurality of network impairment indicators for each of the plurality of quality factors by the difference between the maximum R-Value and the actual R-Value.

Figure 9:
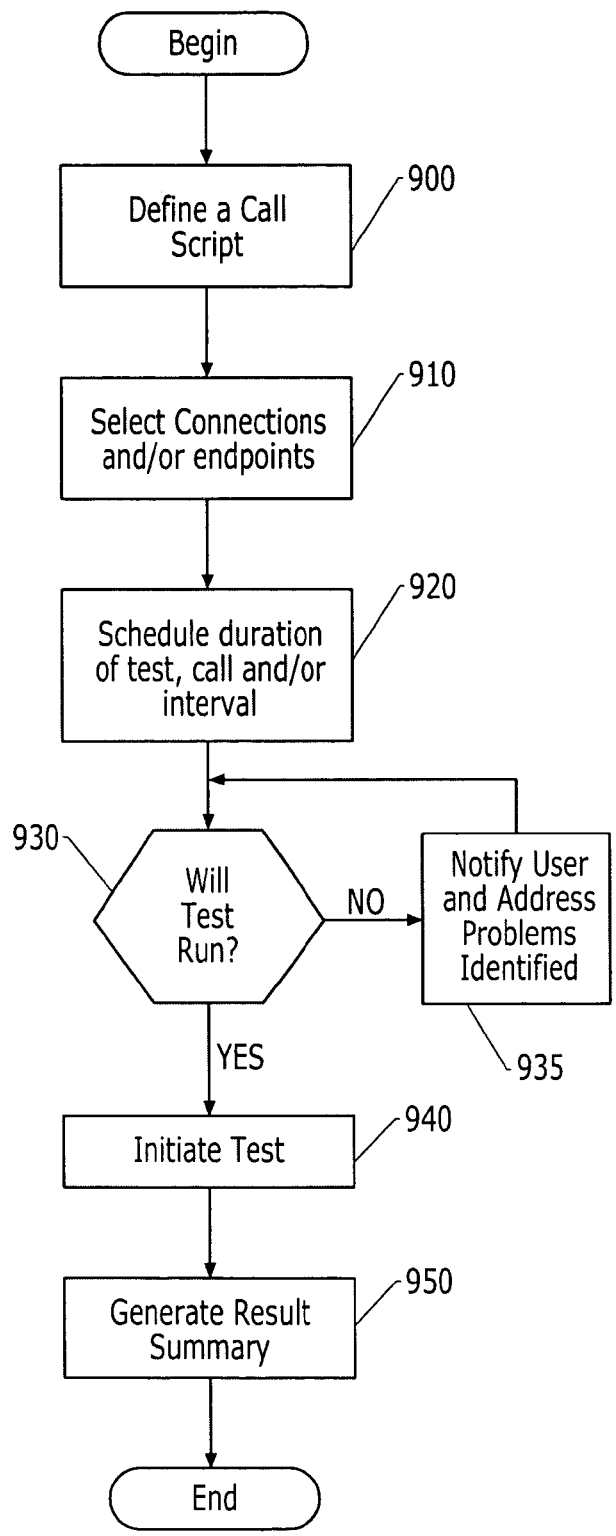
FIG. 9 is a flow chart illustrating operations for evaluating network performance according to embodiments of the present invention.

Referring now to the flowchart diagram of FIG. 9, operations for evaluating a network will be further described for various embodiments of the present invention. Embodiments of the present invention illustrated in FIG. 9 are discussed with respect to networks that support packetized voice communications, for example, VoIP. It will be understood that although the operations of FIG. 9 are discussed with respect to packetized voice communications, the present invention is not limited to this type of traffic. Alternatively, the network may support any packetized audio and/or video communications.

A call script is defined (block 900). A call script may represent simulated voice traffic, i.e. the key attributes of a VoIP call. A user can customize the call script to test particular aspects of the network. For example, the user may choose the particular codec to be used during the test. The codec may or may not support packet loss concealment. If the codec does support packet loss concealment, this feature may be activated or deactivated. If the codec supports packet loss concealment and the feature is activated, the codec may have a better capability of handling lost packets. The user may also configure, among other things, a jitter buffer, select a number of concurrent calls, select a QoS and/or select a speech packet size. The user may also enable or disable silence suppression, may override the delay between the transmissions of packets and/or add a fixed delay to the network. A user may want to add a fixed delay to a network, for example, if it is determined that a particular product/phone adds a fixed delay to the network. Including this fixed delay in the script may simulate such a product/phone more accurately.

A connection and/or a pair of endpoints for the network test protocol may be selected (block 910) for the duration of the test. Calls made over a single connection from a first endpoint to a second endpoint using the same call script may define a call group. One or more call groups may use the same set of first and second endpoints. Quality statistics may be made available on a call group basis as discussed below.

A total duration of the network test protocol, a duration of each individual call and/or an interval between calls may be scheduled (block 920) for the test protocol. Tests may be scheduled to run for a specified time, for example, for up to 7 days. Once the test is designed, i.e. the script is defined and the connections/endpoints are selected, and scheduled, the test is verified (block 930). Verifying may include initiating the test as designed and scheduled for a period of less than the total duration of the network test protocol. This period may be about thirty seconds. If the test is verified, the test is run as designed and scheduled (block 940). If, on the other hand, the test is not verified, the user may be notified and the problem areas may be identified (block 935). For example, there may be a problem with a selected endpoint or an IP address. The user may address the problems identified and rerun the verification until the test is verified (repeat operations of blocks 930 and 935 until the test is verified).

Embodiments of the present invention for evaluating performance of a network may provide many user configurable options for testing an existing network. The network may be tested on an ongoing basis or may be assessed before deployment of the desired traffic on the network. Embodiments of the present invention may provide a user-friendly graphical user interface (GUI) that walks the user through the operations of the present invention discussed with respect to FIG. 9.

Figure 10:
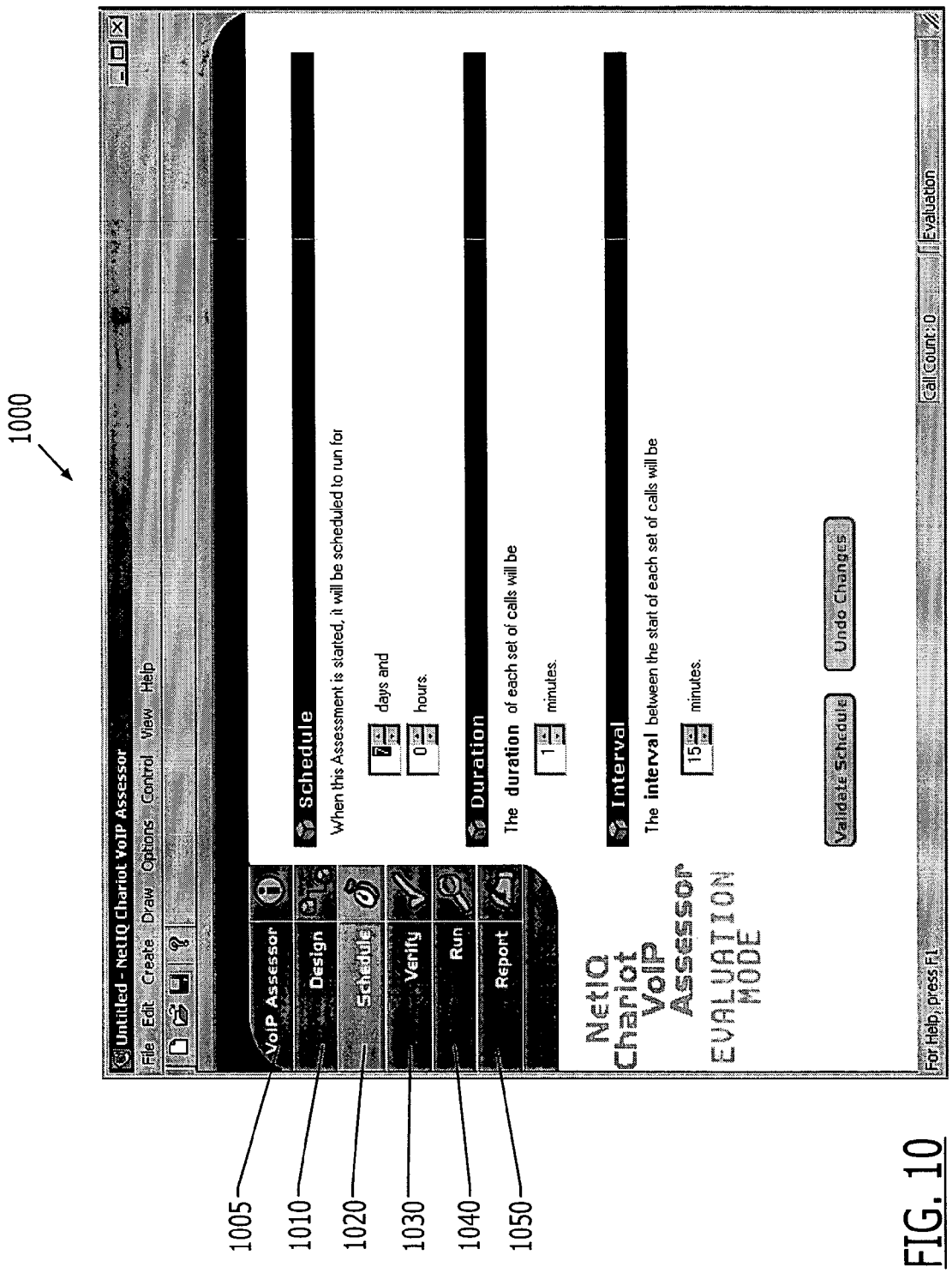
FIG. 10 is a graphical user interface according to embodiments of the present invention.

As illustrated in FIG. 10, a GUI, according to embodiments of the present invention, may provide a list of tasks down the left hand side of the window. The GUI may also provide a view area for each corresponding task on the list, which may make it less likely that a user will make an unintended or premature selection. It will be understood that the GUI 1000 illustrated in FIG. 10 is provided for exemplary purposes only and that GUIs according to embodiments of the present invention are not limited to the GUIs illustrated herein.

As illustrated in the exemplary window of FIG. 10, the "VoIP Assessor" menu 1005 includes selectable displays for, among other things, design 1010, schedule 1020, verify 1030 and run 1040. The design 1010 display may include a user interface for configuring a call script and selecting the connections and/or the endpoints for the test. The schedule 1020 display may include a user interface for scheduling at least one of a total duration of the network test protocol, a duration of each individual call and/or an interval between calls may be scheduled. The verify 1030 display may trigger initiating of the designed and scheduled test for a period less than the total duration of the network test protocol, such as thirty seconds, and provide a display indicating whether or not the test will run. The run 1040 display may actually trigger initiation of the network test protocol that has been designed, scheduled and verified.

Referring again to FIG. 9, a result summary of the network test protocol is generated (block 950). The network performance results may be collected for one or more tests of the network and stored in a database. A result summary or report may be generated for the performance results. The result summary may be displayed in, for example, a text format, which may be printed to a printer or a photocopier. The result summary may be generated to summarize the network performance and indicate network quality using a series of quality thresholds and the network impairment indicators for each quality factor discussed above. The result summary may be, for example, generated using the Report task button 1050 on the left hand side of the GUI 1000 illustrated in FIG. 10.

The quality thresholds may include a good threshold, an acceptable threshold, a poor threshold and/or an unavailable threshold. These thresholds may be configured by the user. In other words, the user may set the limits for each quality threshold, such as the R-Values and/or MOS values that represent the overall network quality, for example, overall call quality. This may allow a user to tailor the results to the user's own idea as to what is acceptable call quality.

As discussed above, a MOS may have a range of from about 1 to about 4.5. Typically, a good quality threshold indicates a mean opinion score (MOS) of about 4.0 or above, an acceptable quality threshold indicates a MOS of from about 3.60 to about 4.0, a poor quality threshold indicates a MOS of about 3.60 or less, and an unavailable quality threshold indicates that a call could not be connected. During a network test protocol each call that is attempted may be assessed and assigned an R-Value that may be mapped to a MOS as discussed above with respect to FIG.

4. According to embodiments of the present invention, each of these MOSs are fit into one of the above described quality thresholds and percentages of calls falling into each threshold category are calculated for each threshold. The results of these calculations may be provided to the user in the result summary (report).

Figure 11:
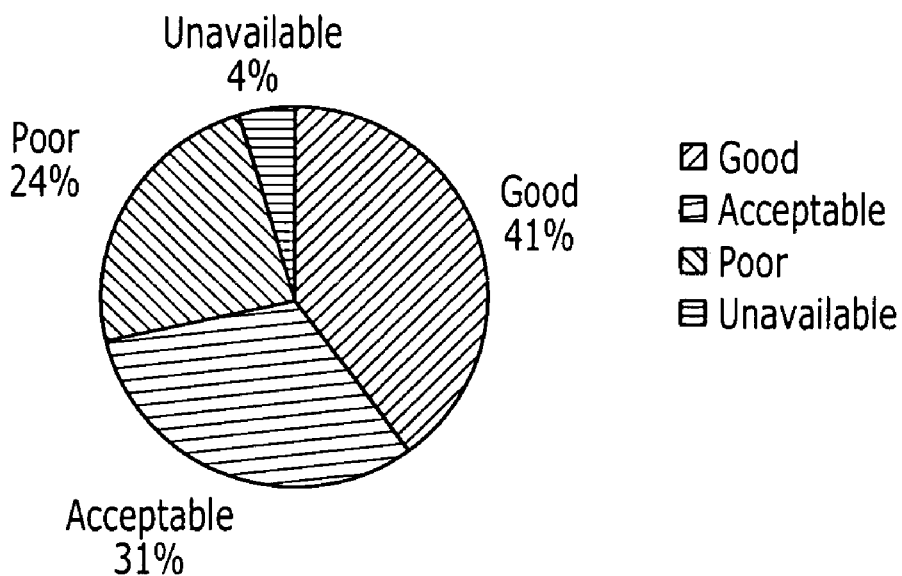
FIG. 11 is a pie chart illustrating quality threshold data according to embodiments of the present invention.

The result summary may include a chart, for example, a pie chart or a bar graph that indicates, by quality threshold, calls made during the execution of the network test protocol. The chart may indicate a percentage of a total number of calls that met each of the quality thresholds during execution of the network test protocol. Each of the quality thresholds may have a different visual representation on the chart as illustrated in FIG. 11. This different visual representation may be provided by different shades, hatchings, colors or the like.

Figure 12:
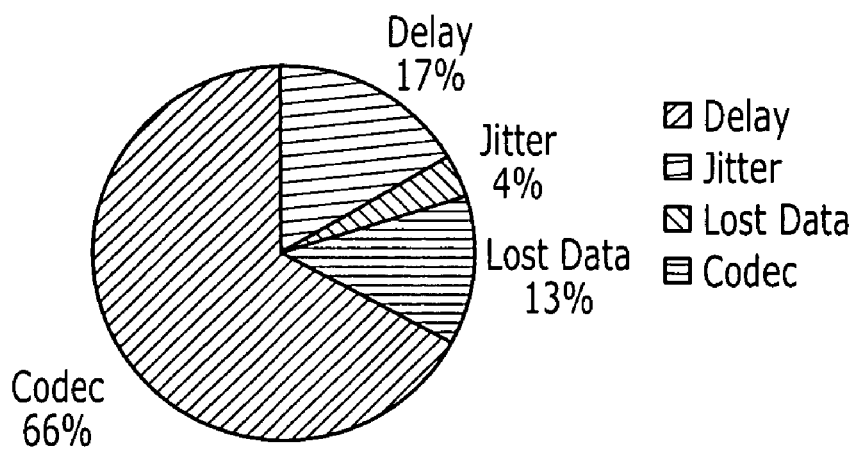
FIG. 12 is a pie chart illustrating network impairment indicators according to embodiments of the present invention.
Figure 13:
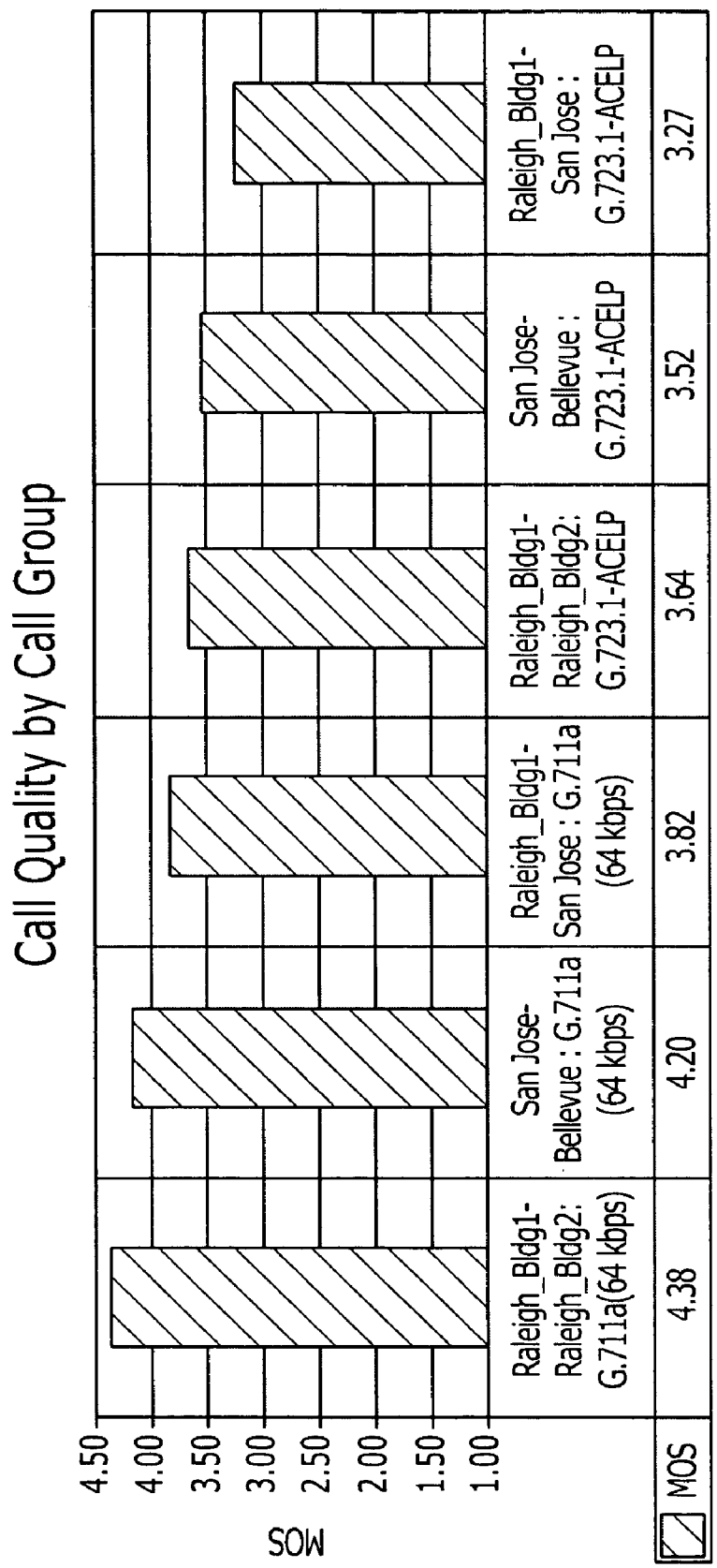
FIG. 13 is a bar graph illustrating call quality by call group according to embodiments of the present invention.

The result summary may further include a chart, for example, a pie chart, that illustrates the network impairment ratios for each of the quality factors discussed above. Each of the quality factors may have a different visual representation on the chart as illustrated in FIG. 12. This different visual representation may be provided by different shades, hatchings, colors or the like.

As discussed above, multiple calls over a connection between a first endpoint and a second endpoint utilizing the same call script may define a call group. The result summary may include a chart illustrating call quality by call group. The result summary may further include a chart illustrating a daily call quality summary and/or an hourly call quality summary. These charts may be, for example, bar graphs similar to the bar graph illustrated in FIG. 13.

Result summaries according to embodiments of the present invention may take on many forms. For example, the result summary may be a 5-10 page report indicating the major results/issues of the performance test. Alternatively, the result summary may be a more extensive report containing all the details of the results of the network performance test or a shorter report. The types of information and charts described above are only provided herein for exemplary purposes and do not limit the types of information and charts that may be found in result summaries according to embodiments of the present invention.

Network quality assessment according to embodiments of the present invention may also be provided as a component of overall network assessment as will now be further described with reference to the GUI illustrations in the context of VoIP of FIGS. 14, 15A-15B, 16A-16C and 17. Although the following discussion focuses on VoIP traffic, it will be understood that the present invention is not so limited and may include any type of data stream without departing from the teachings described herein.

Figure 14:
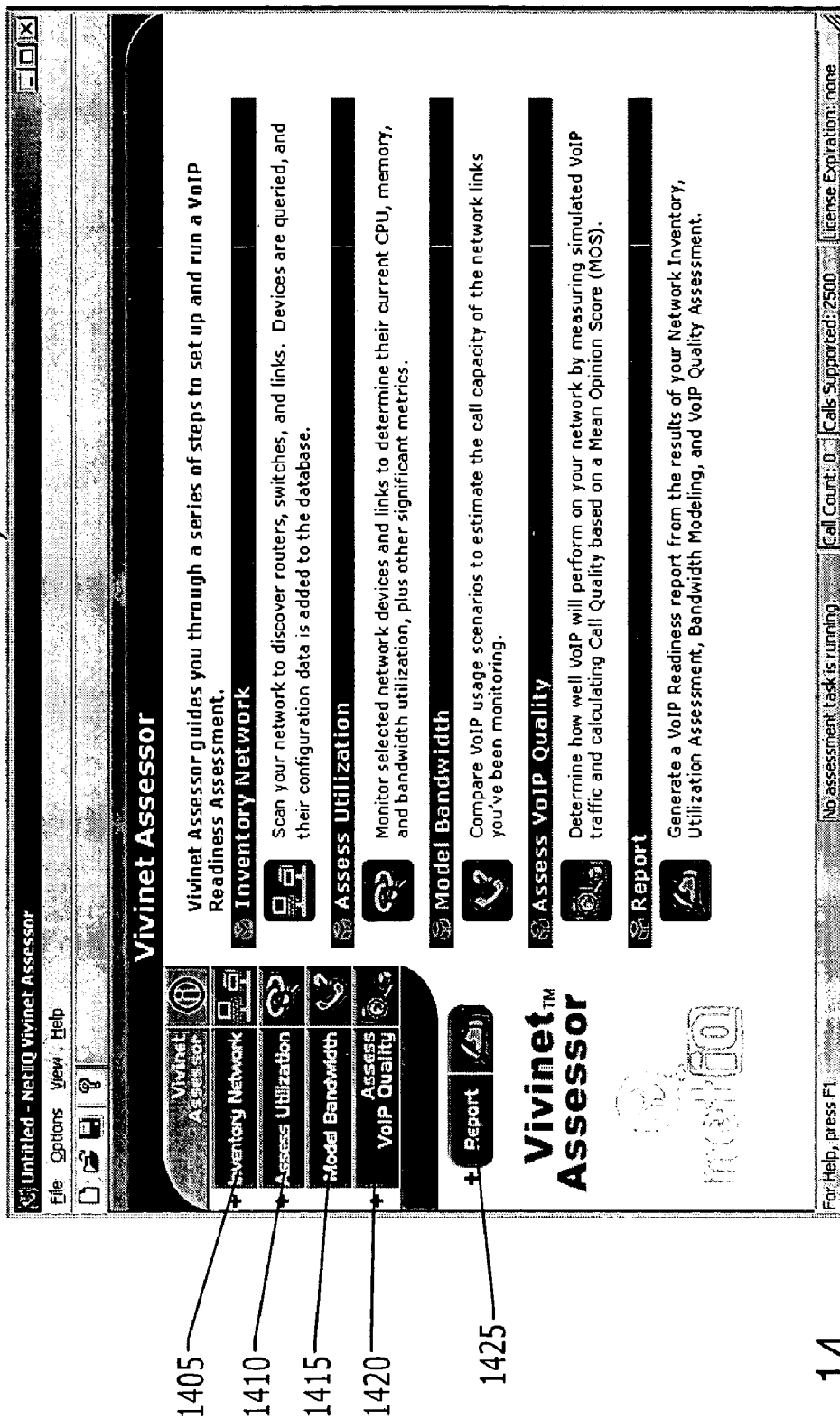
FIG. 14 is a graphical user interface according to embodiments of the present invention.

As illustrated in FIG. 14, quality assessment for packetized services, such as VoIP, may be beneficially integrated with obtaining an inventory of network devices/links, assessing utilization of those devices/links and modeling the bandwidth of the communication links defined by the network devices to, for example, estimate the call capacity of the network links. In addition, it is to be understood that the overall configuration of the network could also be assessed for suitability for packetized communications, such as VoIP or streaming video. For example, model and operating system version information about devices on the network could be used as a basis to determine the suitability of the network independent of assessments based on utilization or quality. While each of these operations may be beneficially applied to network analysis, the GUI illustrated in FIG. 14 is arranged to provide a beneficial flow of operations based on interrelationships between these distinct activities. Thus, the Inventory Network button 1405, Assess Utilization button 1410, Model Bandwidth button 1415 and Assess VoIP Quality button 1420 are located sequentially adjacent each other extending down along the left hand side of the GUI 1400. However, it will be understood that not all of the illustrated assessment operations need be provided and that the sequential ordering of the tasks need not require that the tasks be completed in the indicated sequence.

The Report button 1425 is located below the analysis operation buttons 1405, 1410, 1415 and 1420. The Report button 1425 may provide a single interface for user initiated reports based on information from any of the provided assessments.

Figure 15A:
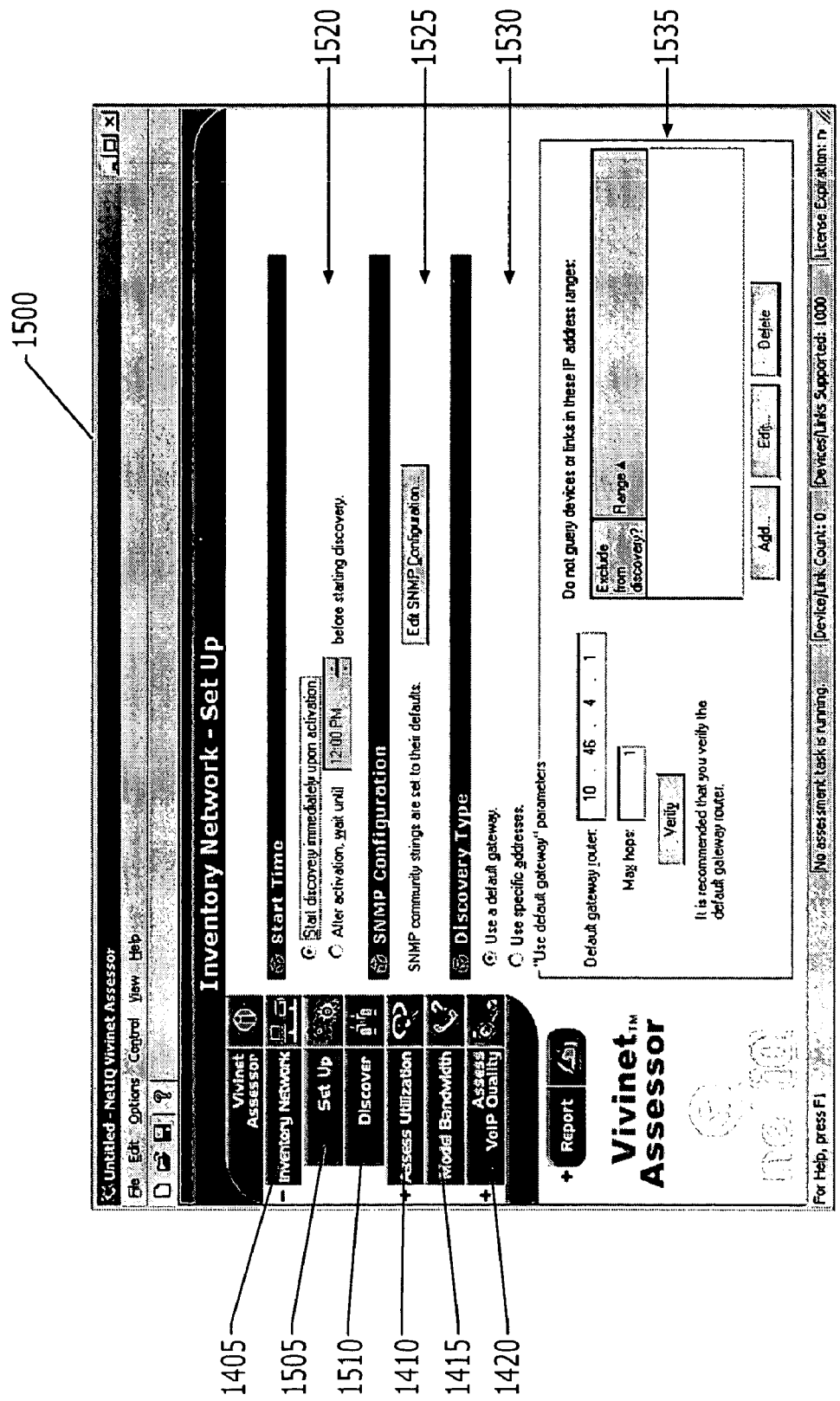
FIGS. 15A and 15B are graphical user interfaces related to network inventory operations according to embodiments of the present invention.
Figure 15B:
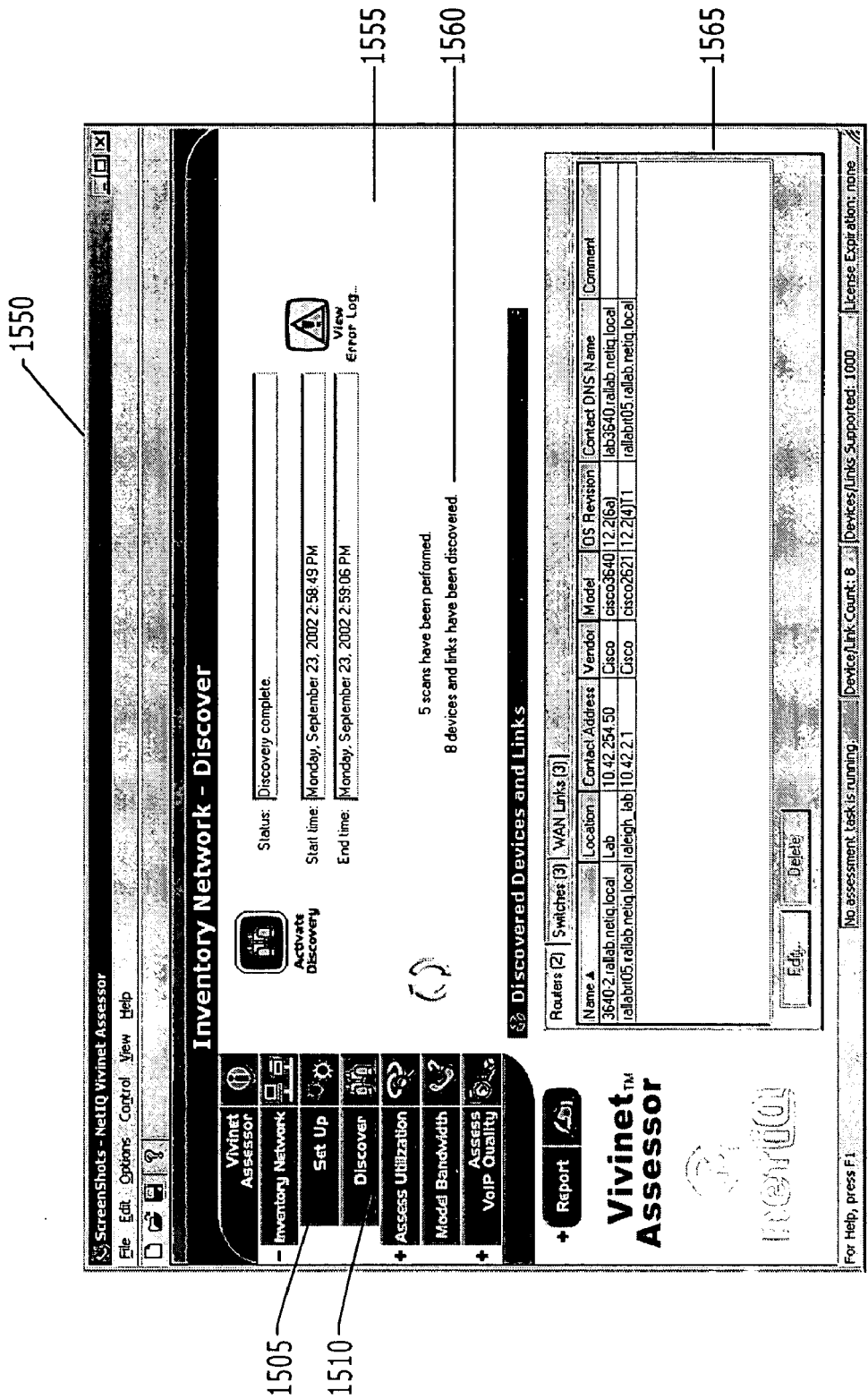

Operations related to network inventory will now be further described with reference to FIGS. 15A and 15B. Inventory operations may relate to discovery of switches, routers, links (or a full path) and the like on the network. Thus, all switches and routers as well as WAN links in a user's network may be discovered in various embodiments of the present invention. In addition these devices may be queried, for example, to gather information about their suitability for VoIP traffic. In addition to routers, switches and links, endpoint devices may also be discovered and queried as to their suitability for packetized communications, such as VoIP and/or video, for example, based on the operating system version running on the device to provide a network configuration assessment in addition to or instead of utilization and quality assessments. FIG. 15A illustrates the Inventory Network Set Up GUI 1500 associated with the Inventory Network Set Up button 1505. FIG. 15B illustrates the Inventory Network Discover GUI 1550 associated with the Inventory Network Discover button 1510.

For the exemplary Inventory Network Set Up GUI 1500 of FIG. 15A, a start time field 1520 allows selection of either immediate discovery on activation or scheduled later discovery following activation. As SNMP queries may beneficially be used for discovery operations, the SNMP configuration field 1525 allows editing of SNMP configuration options before discovery operations execute. The discovery type field 1525 illustrated in FIG. 15A provides for use of a default gateway or specification of a particular gateway. In addition, a default gateway parameter field 1525 is shown that may be used to specify the default gateway and to exclude specified IP address ranges from discovery.

Additional user information may be input in connection with the setup of the discovery operations. A user may specify a subnet or address range and may specify discovery of all devices/interfaces in that range or subnet. The user specification may be by IP address for a specific device or devices. The user may also specify, for example, a starting point such as a default gateway or router and discover information from that router/gateway and from that information operations may proceed to discover other devices and traverse the network until some specified limit is reached. While discovery is running, a user may prevent other operations, such as utilization or quality assessment, or such operations may be prevented by default.

The exemplary Inventory Network Discover GUI 1550 illustrated in FIG. 15B includes an activate field 1555 showing the status, start and end time of the discovery operations. A summary field 1560 indicates the number of scans executed during discovery operations and the number of devices/links discovered. The number of scans through particular IP address range(s) may be specified for a particular discovery operation or established as a default.

Finally, a discovered devices and links field 1565 provides information on the discovered devices/links.

For the example illustrated in FIG. 15B, the discovered devices are categorized as routers, switches or wide area network (WAN) links, with a separate display for each. Various information about each discovered device/link is also displayed in field 1565 for the embodiments of the present invention illustrated in FIG. 15B. As shown for the two discovered routers, a name, location, contact address, vendor, model, operating system (OS) revision number, contact domain name server (DNS) name and comment field are provided. This and/or other information may be obtained, for example, using known SNMP queries. In addition to, or instead of, auto discovery, a user may be provided the option of manually adding devices for use in utilization and monitoring operations to be described below or the quality assessment operations described previously.

Figure 16A:
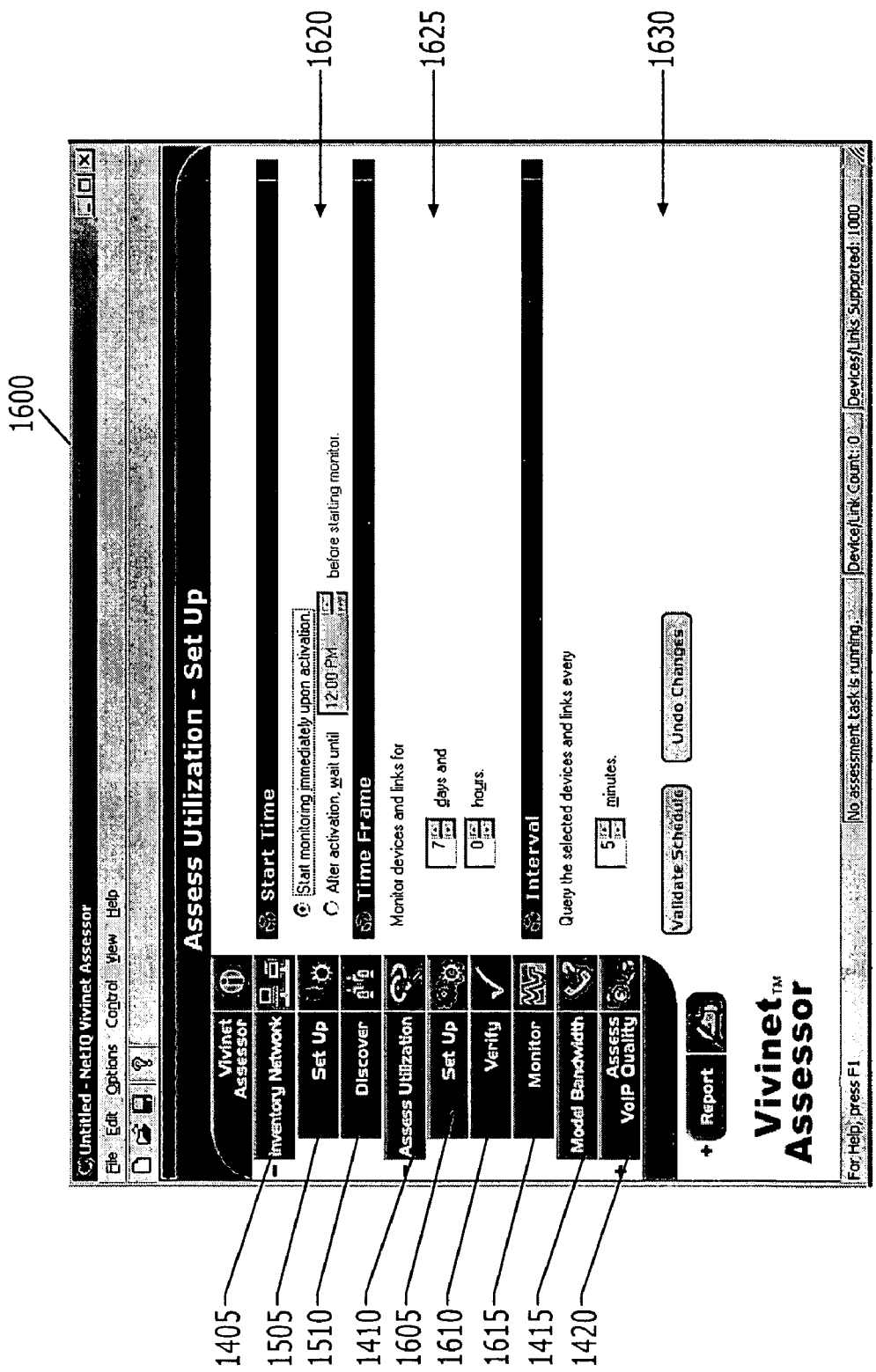
FIGS. 16A to 16C are graphical user interfaces related to utilization assessment according to embodiments of the present invention.
Figure 16B:
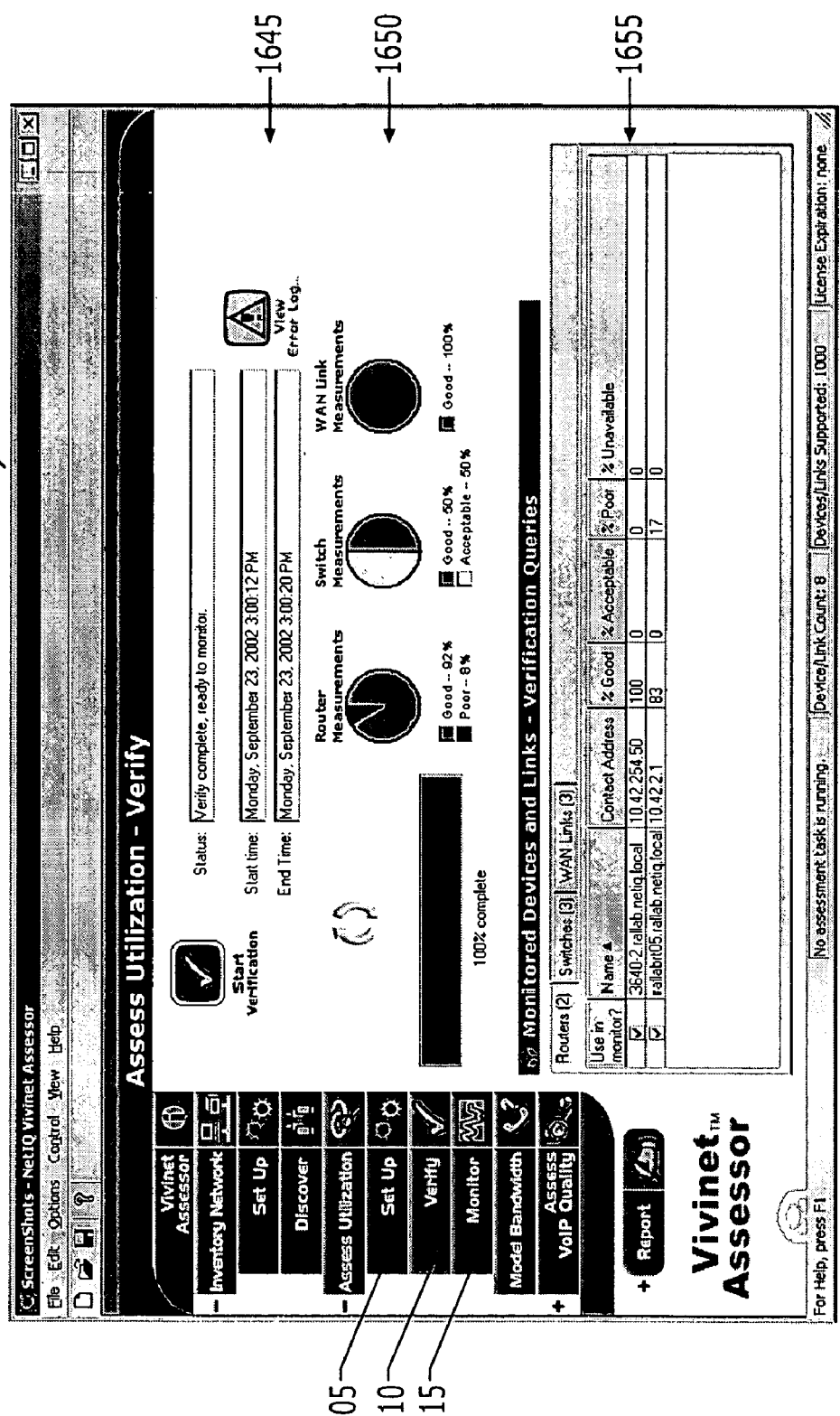
Figure 16C:
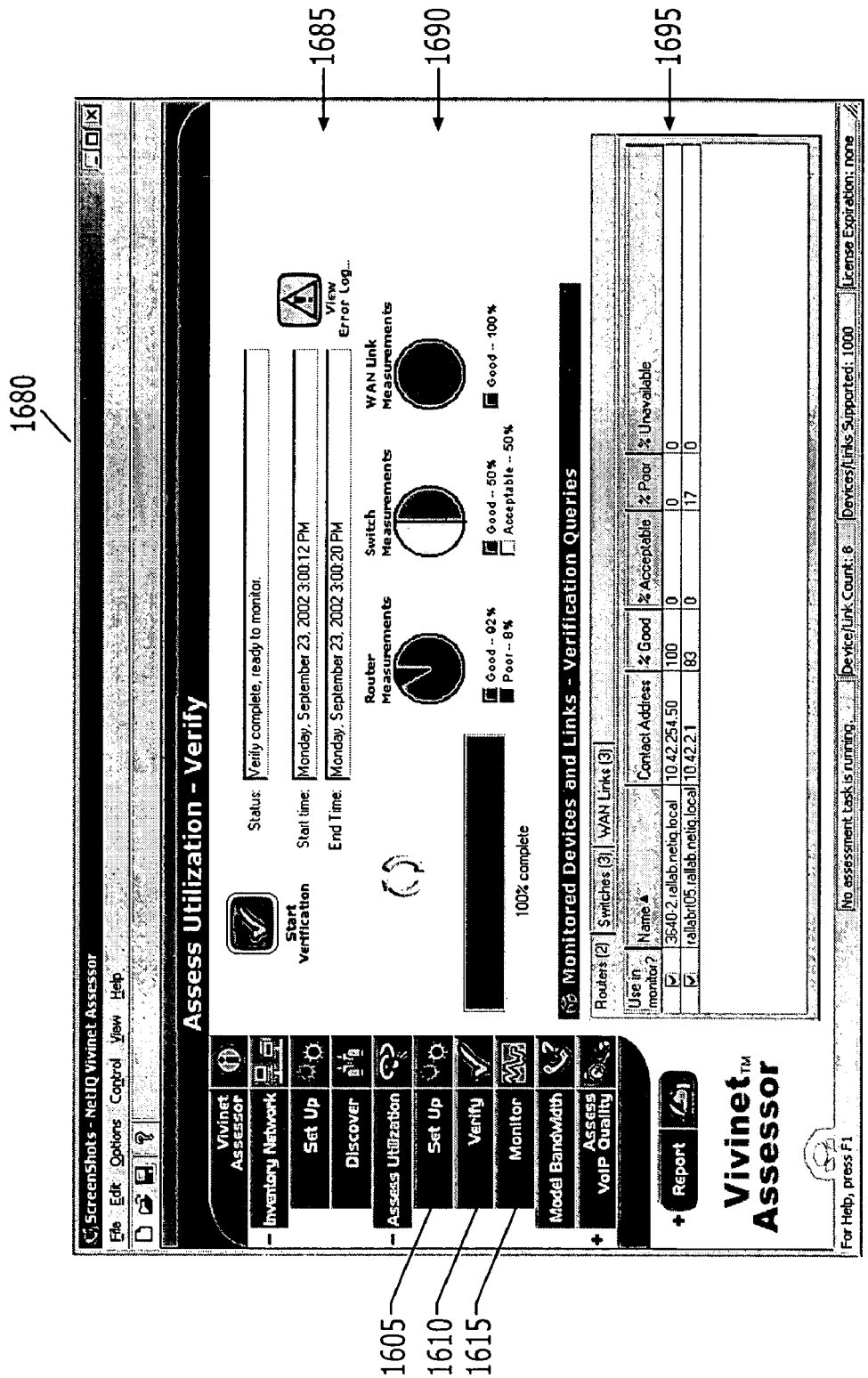

Operations related to assessing utilization will now be further described with reference to FIGS. 16A-16C. The Assess Utilization—Set Up GUI 1600 associated with the Assess Utilization Set Up button 1605 is illustrated in FIG. 16A. The Assess Utilization—Verify GUI 1640 associated with the Assess Utilization Verify button 1610 is illustrated in FIG. 16B. The Assess Utilization—Monitor GUI 1680 associated with the Assess Utilization Monitor button 1615 is illustrated in FIG. 16C. The Assess Utilization—Set Up GUI 1600 illustrated in FIG. 16A includes a start time field 1620 allowing selection of monitoring immediately upon activation or specification of a delay before monitoring operations begin. The time frame field 1625 allows a user to specify the time duration during which the network devices/links will be monitored. Finally, the interval field 1630 allows a user to specify the frequency at which devices are queried during monitoring (i.e., the interval between queries).

While a number of the variables associated with utilization assessment are shown as user selectable in FIG. 16A, it is to be understood that not all of these particular variables need be user selectable and that other variables not selectable in FIG. 16A may be user selectable in various embodiments of the present invention. In addition, a user may be provided the option of selecting what devices/links are subjected to utilization assessment and/or all of the devices discovered may be included in the utilization assessment as shown, for example in FIG. 16B ("Use in Monitor?" Field). A user may further be provided the option of stopping an assessment during execution, for example, should an impact threshold be violated, indicating that the assessment may be negatively impacting the user's network or if the assessment results are overwhelmingly poor partway through the assessment making it unlikely that additional useful information will result from further testing.

FIG. 16B illustrates an example of an Assess Utilization—Verify GUI 1640 according to embodiments of the present invention. As shown in FIG. 16B, the GUI 1640 includes a status field 1645 showing the status of verify operations and the start and stop time of the verify operations. The graphics field 1650 includes pie charts based on the utilization data obtained from the devices/links during the verify operations applying specification of performance thresholds for various utilization statistics grouped as good, acceptable, poor or unavailable. Router, switch and WAN link results are presented separately, for example, as percentages. In addition, a bar graphic is provided showing progress to completion of the verify operations. Finally, a monitored devices and links—verification queries field 1655 displays underlying data similarly grouped with associated identification of individual devices/links.

FIG. 16C illustrates an example of an Assess Utilization—Monitor GUI 1680 according to embodiments of the present invention. As shown in FIG. 16C, the GUI 1680 includes a status field 1685 showing the status of monitor operations and the start and stop time of the monitor operations. The graphics field 1690 includes pie charts based on the utilization data obtained from the devices/links during the monitor operations applying specification of performance thresholds for various utilization statistics grouped as good, bad, acceptable or unavailable. Router, switch and WAN link results are presented separately, for example, as percentages. In addition, a bar graphic is provided showing progress to completion of the monitor operations. Finally, a monitored devices and links—all queries field 1695 displays underlying data similarly grouped with associated identification of individual devices/links.

As is illustrated by comparing the examples of FIGS. 16B and 16C, verify operations may be provided by a limited execution count/period of monitor operations. Thus, as the examples of verify in FIG. 16B and monitor in 16C each were based on only a single poll/query, substantially identical results are provided. However, it is to be understood that monitor operations will typically involve a greater number of polls (queries of the discovered devices/links) and may, therefore, provide significantly different results than verify operations. Thus, as illustrated by the examples of FIGS. 16A-16C, monitor operations may monitor the switches, routers, and WAN links discovered on the network to gather information about their current utilization and determine their capacity for carrying particular types of network traffic, for example, additional VoIP traffic. In particular embodiments of the present invention, the information may be gathered from SNMP polling. Exemplary information that may be so gathered includes, for example, device-specific information about queuing and input/output queue drops, WAN link bandwidth utilization, CPU and buffer (memory) utilization, buffer and CRC errors and the like depending on the type of device/link providing the information and the available utilization information for that device/link. A device readiness rating was assigned to each monitored device or link based on the findings.

The monitored information may be based on a test of a scheduled duration and polling information specifying when, for example, the device/link Management Information Bases (MIBs) are polled and their utilization statistics are recorded. An exemplary readiness rating operation, with the utilization statistics evaluated and the thresholds applied for particular types of devices/links is as follows.

Table 2 illustrates exemplary router measurement information and corresponding thresholds with router ratings generated based on the router result threshold ranges from data acquired during a monitor utilization assessment test period.

TABLE 2

Router Readiness Ratings

| Measurement | Good | Acceptable | Poor |
|---|---|---|---|
| Average CPU Utilization (%) | Below 30.0 | 30.0 to 50.0 | Above 50.0 |
| Peak CPU Utilization (%) | Below 50.0 | 50.0 to 75.0 | Above 75.0 |
| Average Buffer Utilization (%) | Below 30.0 | 30.0 to 50.0 | Above 50.0 |
| Peak Buffer Utilization (%) | Below 50.0 | 50.0 to 75.0 | Above 75.0 |
| Input Queue Drops (%) | Below 2.0 | 2.0 to 8.0 | Above 8.0 |

TABLE 2-continued

Router Readiness Ratings

| Measurement | Good | Acceptable | Poor |
|---|---|---|---|
| Output Queue Drops (%) | Below 2.0 | 2.0 to 8.0 | Above 8.0 |
| Buffer Errors | 0 | 1 | Above 1 |
| CRC Errors (%) | Below 2.0 | 2.0 to 8.0 | Above 8.0 |

Table 3 illustrates exemplary switch measurement information and corresponding thresholds with switch ratings generated based on the switch result threshold ranges from data acquired during a monitor utilization assessment test period.

TABLE 3

Switch Readiness Ratings

| Measurement | Good | Acceptable | Poor |
|---|---|---|---|
| Average Backplane Utilization (%) | Below 50.0 | 50.0 to 75.0 | Above 75.0 |
| Peak Backplane Utilization (%) | Below 75.0 | 75.0 to 85.0 | Above 85.0 |
| Average CPU Utilization (%) | Below 30.0 | 30.0 to 50.0 | Above 50.0 |
| Peak CPU Utilization (%) | Below 50.0 | 50.0 to 75.0 | Above 75.0 |

Table 4 illustrates exemplary WAN Link measurement information and corresponding thresholds with WAN Link ratings generated based on the WAN Link result threshold ranges from data acquired during a monitor utilization assessment test period.

TABLE 4

WAN Link Readiness Ratings

| Measurement | Good | Acceptable | Poor |
|---|---|---|---|
| Average Bandwidth Utilization (%) | Below 30.0 | 30.0 to 50.0 | Above 50.0 |
| Peak Bandwidth Utilization (%) | Below 50.0 | 50.0 to 75.0 | Above 75.0 |

The ratings thresholds above are exemplary ratings that may be used to categorize utilization results as good, acceptable or poor. In general, these thresholds are believed by the present inventors to indicate that no changes are needed to the network for a good rating, some reconfiguration or an upgrade may be desirable to assure network readiness for an acceptable rating and that a device/link may not be ready to carry additional network traffic for a poor rating. An unavailable rating may also be provided for categorizing devices/links found unavailable for VoIP, for example, based on an inability to communicate with the device during the utilization assessment.

As described above in more detail with reference to network quality assessment operations (associated with the Assess VoIP Quality button 1420 in FIGS. 14 through 17), a variety of reports including graphical and/or tabular presentations of network device/link suitability for packetized communications, such as VoIP, may be provided based on the information obtained from network utilization assessment as described herein. A single report selection interface may be utilized for each type of assessment activity. An executive summary report may be provided including an overview of each assessment activity run and the associated results. Report specification by a user may include a user specified filtering, for example, of a desired time frame of data for including in the report.

As noted above, queried device/link information, such as the types of information identified in the tables above, may be used as well as (or instead of) information generated from active communications generated on the network for network quality assessment. Thus, quality ratings may also be based on information obtained from devices/links, for example, using SNMP polling as described with reference to utilization assessment operations.

Figure 17:
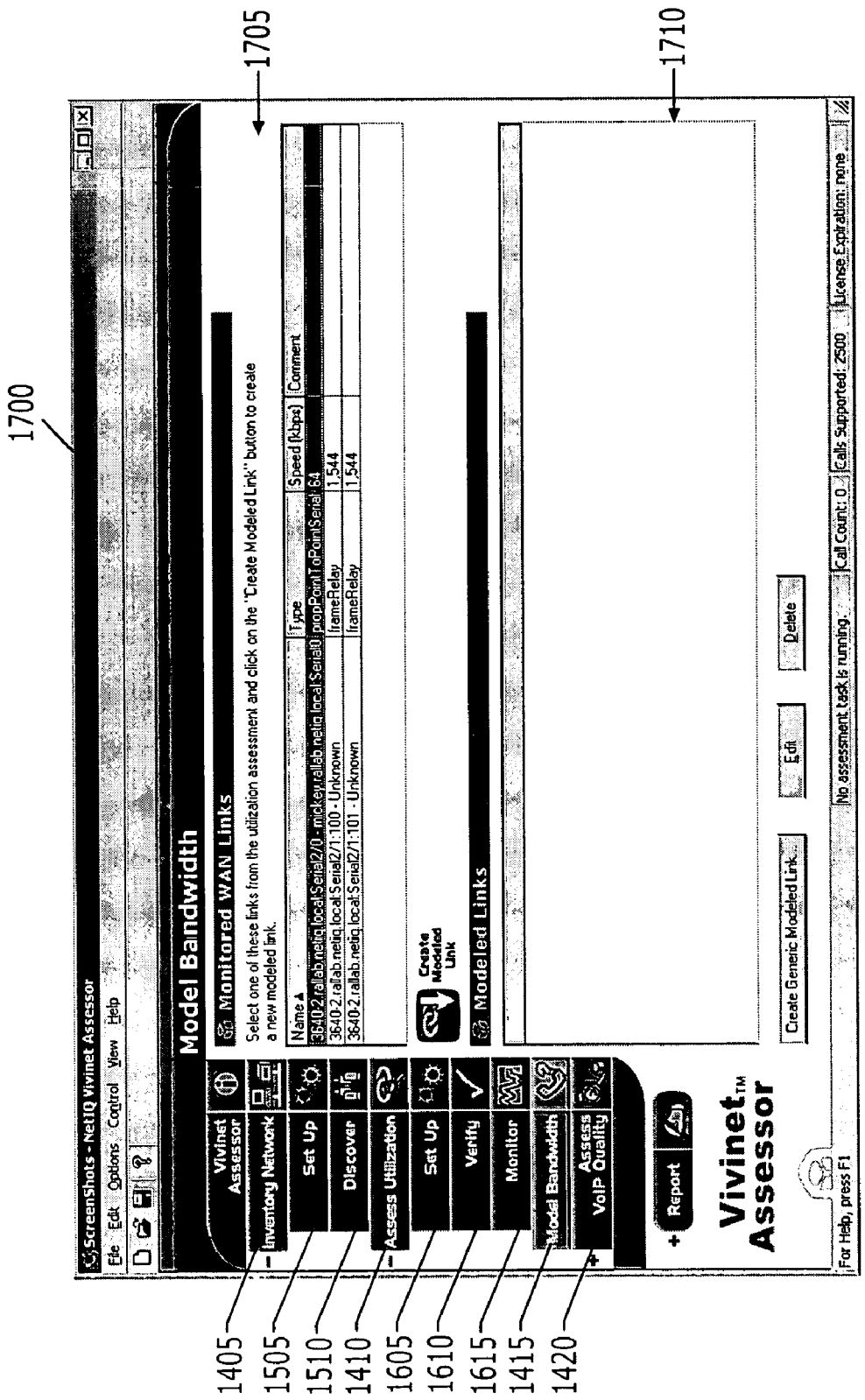
FIG. 17 is a graphical user interface according to embodiments of the present invention.

Referring to FIG. 17, bandwidth modeling may also be provided in accordance with embodiments of the present invention, for example, to estimate the call capacity of monitored network links. The Model Bandwidth GUI 1700 of FIG. 17 is associated with the Model Bandwidth button 1415. The Model Bandwidth GUI 1700 includes a monitored WAN links field 1705 that allows a user to select a link to be modeled. The results of the modeling may then be displayed in the modeled links field 1710. The models may be further edited by a user and generic modeled links may be created. For example, models may be used to predict the call capacity of a link based on the selection of a particular type of codec for the link. Various other user inputs may be provided in evaluation based on bandwidth modeling, such as anticipated capacity or link type for a link, enabling of RTP header compression, link target utilization, busy hour Erlang B and/or blocking percentage.

As described above with respect to FIGS. 1 through 17, the present invention describes methods, systems and computer program products for evaluating performance of a network that supports packetized communications. A network test protocol may be run and a plurality of network impairment indicators may be generated for each of a plurality of quality factors. These network impairment indicators may be used to identify problems in a network, which may eventually lead to more reliable networks having better overall network quality ratings. Furthermore, these impairment factors as well as other indications of network quality may be summarized in a result summary. This result summary may provide a simplified view of results of a network performance test.

It will be understood that the block diagram illustrations of FIGS. 1-3 and combinations of blocks in the block diagrams may be implemented using discrete and integrated electronic circuits. It will also be appreciated that blocks of the block diagram of FIGS. 1-3 and combinations of blocks in the block diagrams may be implemented using components other than those illustrated in FIGS. 1-3, and that, in general, various blocks of the block diagrams and combinations of blocks in the block diagrams, may be implemented in special purpose hardware such as discrete analog and/or digital circuitry, combinations of integrated circuits or one or more application specific integrated circuits (ASICs).

Accordingly, blocks of the block diagrams of FIGS. 1-3 and the flowcharts of FIGS. 5-9 support electronic circuits and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some alternative implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method of evaluating performance of a network that supports packetized communications, the method comprising:
    initiating execution of a network test protocol associated with the packetized communications;
    obtaining network performance data based on the initiated network test protocol;
    generating an overall network quality rating based on the obtained performance data; and
    calculating at least one network impairment indicator based on the overall network quality rating,
    wherein the packetized communications comprise packetized voice communications and wherein initiating execution of the network test protocol comprises:
    defining a call script including configuring at least one of a codec, a jitter buffer, a quality of service (QoS), a speech packet size, a number of concurrent calls, a delay between packets, a fixed delay or silence suppression;
    selecting at least one of connections or endpoints for the network test protocol;
    scheduling at least one of a total duration of the network test protocol, a duration of each individual call or an interval between calls;
    verifying that the network test protocol will operate, wherein verifying includes running the network test protocol for a period less than the total duration of the network test protocol; and
    initiating the network test protocol if the test is verified.

2. The method of claim 1, wherein the packetized communications comprise packetized voice communications, wherein the overall network quality rating comprises an overall call quality rating and wherein calculating at least one network impairment indicator comprises calculating a network impairment indicator for ones of a plurality of quality factors.

3. The method of claim 2, wherein the plurality of quality factors include at least one of a delay factor, a jitter factor, a lost data factor and a codec selection factor.

4. The method of claim 1, wherein the period less than the total duration of the network test protocol comprises a period no more than about 30 seconds.

5. The method of claim 1, wherein the call script is configured to simulate network traffic corresponding to an existing Internet Protocol (IP) phone profile.

6. The method of claim 1, wherein the packetized communications comprises packetized video communications and the network test protocol is associated with the packetized video communications.

7. A method of evaluating performance of a network that supports packetized communications, the method comprising:
    initiating execution of a network test protocol associated with the packetized communications;
    obtaining network performance data based on the initiated network test protocol;
    generating an overall network quality rating based on the obtained performance data; and
    calculating at least one network impairment indicator based on the overall network quality rating,
    wherein the packetized communications comprise packetized voice communications, wherein the overall network quality rating comprises an overall call quality rating, wherein calculating at least one network impairment indicator comprises calculating a network impairment indicator for ones of a plurality of quality factors wherein the plurality of quality factors include at least one of a delay factor, a jitter factor, a lost data factor and a codec selection factor and wherein calculating a network impairment indicator for ones of the plurality of quality factors comprises:
    calculating a maximum overall call quality rating for the network test protocol;
    calculating at least one constrained network impairment indicator for ones of the plurality of quality factors; and
    generating the network impairment indicator for ones of the plurality of quality factors based on the maximum overall call quality rating and the calculated at least one constrained network impairment indicator for ones of the plurality of quality factors.

8. The method of claim 7, wherein the obtained performance data includes a plurality of timing records for a first flow direction and a second flow direction and wherein calculating at least one constrained network impairment indicator for ones of a plurality of quality factors comprises:
    calculating a constrained impairment indicator for ones of the plurality of quality factors for respective ones of the timing records based on the maximum overall call quality rating.

9. The method of claim 8, wherein generating the network impairment indicator for ones of the plurality of quality factors comprises generating an average of the calculated constrained impairment indicators for ones of the plurality of quality factors.

10. The method of claim 7, wherein the overall call quality rating comprises an actual overall call quality rating, the method further comprising:
    determining a difference between the maximum overall call quality and the actual overall call quality rating; and
    calculating a network impairment ratio corresponding to respective ones of the network impairment indicators based on the difference between the maximum overall call quality rating and the actual overall call quality rating and corresponding ones of the network impairment indicators.

11. The method of claim 10, wherein calculating the network impairment ratios corresponding to respective ones of the network impairment indicators comprises dividing the network impairment indicators for ones of the plurality of quality factors by the difference between the maximum overall call quality rating and the actual overall call quality rating.

12. A method of claim 7, wherein the overall call quality comprises at least one of an R-Value and a MOS value and wherein the maximum overall call quality comprises at least one of an R-Value and a MOS value.

13. The method of claim 7, further comprising generating a result summary of the network test protocol.

14. The method of claim 13, wherein generating a result summary further comprises generating a chart that illustrates a plurality of network impairment ratios corresponding to respective ones of a plurality of quality factors.

15. The method of claim 14, wherein generating a chart comprises generating a pie chart and wherein each of the plurality of network impairment ratios has a different associated visual indication on the pie chart.

16. The method of claim 4, further comprising:
obtaining network utilization data from a plurality of devices/links on the network; and
associating ones of the plurality of devices/links with one of a plurality of performance thresholds based on the obtained network utilization data.

17. The method of claim 16, wherein obtaining network utilization data comprises obtaining the network utilization data using a simple network management protocol (SNMP).

18. The method of claim 16, further comprising generating a chart that groups by the associated performance thresholds the ones of the plurality of devices/links.

19. The method of claim 18, further comprising grouping the ones of the plurality of devices/links with one of a plurality of device types and wherein generating a chart comprises generating a separate chart for ones of the plurality of device types.

20. The method of claim 4, further comprising scanning the network to discover devices/links on the network.

21. A method of evaluating performance of a network that supports packetized communications, the method comprising:
initiating execution of a network test protocol associated with the packetized communications;
obtaining network performance data based on the initiated network test protocol;
generating an overall network quality rating based on the obtained performance data;
calculating at least one network impairment indicator based on the overall network quality rating; and
generating a result summary of the network test protocol,
wherein packetized communications comprise packetized voice communications, wherein the overall network quality rating comprises an overall call quality rating, wherein generating an overall network quality rating comprises generating an overall call quality rating for ones of a plurality of calls initiated during execution of the network test protocol and wherein generating the result summary further comprises:
associating the overall call quality ratings for ones of the plurality of calls initiated with one of a plurality of quality thresholds; and
generating a chart that groups by the associated quality thresholds calls initiated during execution of the network test protocol.

22. The method of claim 21, wherein generating a chart comprises generating a chart that indicates a percentage of a total number of calls associated with ones of the plurality of quality thresholds.

23. The method of claim 21, wherein generating a chart comprises generating a pie chart and wherein each of the plurality of quality thresholds has a different associated visual indication on the pie chart.

24. The method of claim 21, wherein the plurality of quality thresholds comprise a good threshold, an acceptable threshold, a poor threshold and/or an unavailable threshold and wherein the quality thresholds are user configurable.

25. The method of claim 24, wherein the good quality threshold indicates a mean opinion score (MOS) of about 4.0 or above, wherein the acceptable quality threshold indicates a MOS of from about 3.60 to about 4.0, wherein the poor quality threshold indicates a MOS of about 3.60 or less, and wherein the unavailable quality threshold indicates that a call could not be connected.

26. A method of evaluating performance of a network that supports packetized communications, the method comprising:
initiating execution of a network test protocol associated with the packetized communications;
obtaining network performance data based on the initiated network test protocol; generating an overall network quality rating based on the obtained performance data; calculating at least one network impairment indicator based on the overall network quality rating; and
generating a result summary of the network test protocol, wherein generating a result summary of the network test protocol further comprises generating at least one of a chart illustrating a call quality summary by call group, a daily call quality summary or an hourly call quality summary.

27. The method of claim 26, wherein a call group comprises a plurality of calls initiated over a connection between a first endpoint and a second endpoint utilizing a single call script.

28. A system for evaluating performance of a network that supports packetized communications, the system comprising:
a test module that is configured to initiate execution of a network test protocol associated with the packetized communications, obtain network performance data based on the initiated network test protocol and generate an overall network quality rating based on the obtained performance data; and
a quality impairment module that is configured to calculate at least one network impairment indicator based on the overall network ciuality rating,
wherein the packetized communications comprise packetized voice communications and wherein the test module that initiates execution of the network test protocol is further configured to:
define a call script including configuring at least one of a codec, a jitter buffer, a quality of service (QoS), a speech packet size, a number of concurrent calls, a delay between packets, a fixed delay or silence suppression;
select at least one of connections or endpoints for the network test protocol;
schedule at least one of a total duration of the network test protocol, a duration of each individual call or an interval between calls;
verify that the network test protocol will operate, wherein verifying includes running the network test protocol for a period less than the total duration of the network test protocol; and
initiate the network test protocol if the test is verified.

29. The system of claim 28, wherein the packetized communications comprise packetized voice communications, wherein the overall network quality rating comprises an overall call quality rating and the quality impairment module is further configured to calculate a network impairment indicator for ones of a plurality of quality factors.

30. The system of claim 29, wherein the plurality of quality factors comprise at least one of a delay factor, a jitter factor, a lost data factor or a codec selection factor.

31. The system of claim 28, wherein the period less than the total duration of the network test protocol comprises a period of no more than about 30 seconds.

32. The system of claim 28, wherein the call script is configured to simulate network traffic corresponding to an existing Internet Protocol (IP) phone profile.

33. The system of claim 28, wherein the packetized communications comprises packetized video communications and the network test protocol is associated with the packetized video communications.

34. A system for evaluating performance of a network that supports packetized communications, the system comprising:
a test module that is configured to initiate execution of a network test protocol associated with the packetized communications, obtain network performance data based on the initiated network test protocol and generate an overall network quality rating based on the obtained performance data; and
a quality impairment module that is configured to calculate at least one network impairment indicator based on the overall network quality rating,
wherein the packetized communications comprise packetized voice communications, wherein the overall network quality rating comprises an overall call quality rating and the quality impairment module is further configured to calculate a network impairment indicator for ones of a plurality of quality factors, wherein the plurality of quality factors comprise at least one of a delay factor, a jitter factor, a lost data factor or a codec selection factor and wherein the quality impairment module that is configured to calculate a network impairment indicator for ones of a plurality of quality factors is further configured to:
calculate a maximum overall call quality rating for the network test protocol;
calculate at least one constrained network impairment indicator for ones of the plurality of quality factors; and
generate the network impairment indicator for ones of the plurality of quality factors based on the maximum overall call quality rating and the calculated at least one constrained network impairment indicator for ones of the plurality of quality factors.

35. The system of claim 34, wherein the obtained performance data includes a plurality of timing records for a first flow direction and a second flow direction and wherein the quality impairment module that is configured to calculate at least one constrained network impairment indicator for ones of a plurality of quality factors is further configured to:
calculate a constrained impairment indicator for ones of the plurality of quality factors for respective ones of the timing records based on the maximum overall call quality rating.

36. The system of claim 35, wherein the quality impairment module that is configured to generate the network impairment indicator for ones of the plurality of quality factors is further configured to generate an average of the calculated constrained impairment indicators for ones of the plurality of quality factors.

37. The system of claim 34, wherein the overall call quality rating comprises an actual overall call quality rating and wherein the quality impairment module is further configured to:
determine a difference between the maximum overall call quality and the actual overall call quality rating; and
calculate a network impairment ratio corresponding to respective ones of the network impairment indicators based on the difference between the maximum overall call quality rating and the actual overall call quality rating and corresponding ones of the network impairment indicators.

38. The system of claim 37, wherein the quality impairment module that is configured to calculate a network impairment ratio corresponding to respective ones of the network impairment indicators is further configured to divide the network impairment indicators for ones of the plurality of quality factors by the difference the maximum overall call quality and the actual overall call quality rating.

39. The system of claim 34, wherein the overall call quality comprises at least one of an R-Value and a MOS value and wherein the maximum overall call quality comprises at least one of an R-Value and a MOS value.

40. The system of claim 34, further comprising:
a result summary module that is configured to generate a result summary of the network test protocol.

41. The system of claim 40, wherein the result summary module is further configured to generate a chart that illustrates a plurality of network impairment ratios corresponding to respective ones of a plurality of quality factors.

42. The system of claim 41, wherein the result summary module is further configured to generate a pie chart and wherein ones of the plurality of network impairment ratios has a different associated visual indication on the pie chart.

43. A system for evaluating performance of a network that supports packetized communications, the system comprising:
a test module that is configured to initiate execution of a network test protocol associated with the packetized communications, obtain network performance data based on the initiated network test protocol and generate an overall network quality rating based on the obtained performance data;
a quality impairment module that is configured to calculate at least one network impairment indicator based on the overall network quality rating; and
a result summary module that is configured to generate a result summary of the network test protocol,
wherein the packetized communications comprise packetized voice communications,
wherein the overall network quality rating comprises an overall call quality rating, wherein the test module is further configured to generate an overall call quality rating for ones of a plurality of calls initiated during execution of the network test protocol and the result summary module is further configured to:
associate the overall call quality ratings for ones of the plurality of calls initiated with one of a plurality of quality thresholds; and
generate a chart that groups by the associated quality thresholds calls initiated during execution of the network test protocol.

44. The system of claim 43, wherein the result summary module is further configured to generate a chart that indicates a percentage of a total number of calls associated with ones of the plurality of quality thresholds.

45. The system of claim 43, wherein the result summary module is further configured to generate a pie chart and wherein ones of the plurality of quality thresholds has a different associated visual indication on the pie chart.

46. The system of claim 43, wherein the plurality of quality thresholds comprise a good threshold, an acceptable threshold, a poor threshold and/or an unavailable threshold and wherein the quality thresholds are user configurable.

47. The system of claim 46, wherein the good quality threshold indicates a mean opinion score (MOS) of about 4.0 or above, wherein the acceptable quality threshold indicates a MOS of from about 3.60 to about 4.0, wherein the poor quality threshold indicates a MOS of about 3.60 or less, and wherein the unavailable quality threshold indicates that a call could not be connected.

48. A system for evaluating performance of a network that supports packetized communications, the system comprising:
   a test module that is configured to initiate execution of a network test protocol associated with the packetized communications, obtain network performance data based on the initiated network test protocol and generate an overall network quality rating based on the obtained performance data;
   a quality impairment module that is configured to calculate at least one network impairment indicator based on the overall network quality rating; and
   a result summary module that is configured to generate a result summary of the network test protocol,
   wherein the result summary module is further configured to generate a result summary of the network test protocol including at least one of a chart illustrating a call quality summary by call group, a daily call quality summary or an hourly call quality summary.

49. The system of claim 48, wherein a call group comprises a plurality of calls initiated over a connection between a first endpoint and a second endpoint utilizing a single call script.

50. A system of evaluating performance of a network that supports packetized communications, the system comprising:
   means for initiating execution of a network test protocol associated with the packetized communications;
   means for obtaining network performance data based on the initiated network test protocol;
   means for generating an overall network quality rating based on the obtained performance data; and
   means for calculating at least one network impairment indicator based on the overall network quality rating,
   wherein the packetized communications comprise packetized voice communications, wherein the overall network quality rating comprises an overall call quality rating, wherein the means for calculating at least one network impairment indicator comprises means for calculating a network impairment indicator for ones of a plurality of quality factors, wherein the plurality of quality factors include at least one of a delay factor, a jitter factor, a lost data factor and a codec selection factor and wherein the means for calculating a network impairment indicator for ones of the plurality of quality factors comprises:
   means for calculating a maximum overall call quality rating for the network test protocol;
   means for calculating at least one constrained network impairment indicator for ones of the plurality of quality factors; and
   means for generating the network impairment indicator for ones of the plurality of quality factors based on the maximum overall call quality rating and the calculated at least one constrained network impairment indicator for ones of the plurality of quality factors.

51. A computer program product for evaluating performance of a network that supports packetized communications, the computer program product comprising:
   a computer-readable storage medium having computer-readable program code embodied in said medium, said computer-readable program code comprising:
   computer-readable program code that initiates execution of a network test protocol associated with the packetized communications;
   computer-readable program code that obtains network performance data based on the initiated network test protocol;
   computer readable program code that generates an overall network quality rating based on the obtained performance data; and
   computer readable program code that calculates a network impairment indicator based on the overall network quality rating,
   wherein the packetized communications comprise packetized voice communications and wherein the computer readable program code that initiates execution of the network test protocol further comprises:
   computer readable program code that defines a call script including configuring at least one of a codec, a jitter buffer, a quality of service (QoS), a speech packet size, a number of concurrent calls, a delay between packets, a fixed delay or silence suppression;
   computer readable program code that selects at least one of connections or endpoints for the network test protocol;
   computer readable program code that schedules at least one of a total duration of the network test protocol, a duration of each individual call or an interval between calls;
   computer readable program code that verifies that the network test protocol will operate, wherein verifying includes running the network test protocol for a period less than the total duration of the network test protocol; and
   computer readable program code that initiates the network test protocol if the test is verified.

52. The computer program product of claim 51, wherein the packetized communications comprise packetized voice communications, wherein the overall network quality rating comprises an overall call quality rating and wherein the computer readable program code that calculates at least one network impairment indicator comprises computer readable program code that calculates a network impairment indicator for ones of a plurality of quality factors.

53. The computer program product of claim 52, wherein the plurality of quality factors include at least one of a delay factor, a jitter factor, a lost data factor and a codec selection factor.

54. The computer program product of claim 51, wherein the period less than the total duration of the network test protocol comprises a period of no more than about 30 seconds.

55. The computer program product of claim 51, wherein the computer readable program code that defines a call script further comprises computer readable program code that configures the call script to simulate network traffic corresponding to an existing Internet Protocol (IP) phone profile.

56. The computer program product of claim 51, wherein the Packetized communications compries packetized video communications and the network test protocol is associated with the packetized video communications.

57. A computer program product for evaluating performance of a network that supports packetized communications, the computer program product comprising:
   a computer-readable storage medium having computer-readable program code embodied in said medium, said computer-readable program code comprising:
   computer-readable program code that initiates execution of a network test protocol associated with the packetized communications;
   computer-readable program code that obtains network performance data based on the initiated network test protocol;
   computer readable program code that generates an overall network quality rating based on the obtained performance data; and
   computer readable program code that calculates a network impairment indicator based on the overall network quality rating,
   wherein the packetized communications comprise packetized voice communications, wherein the overall network quality rating comprises an overall call quality rating and wherein the computer readable program code that calculates at least one network impairment indicator comprises computer readable program code that calculates a network impairment indicator for ones of a plurality of quality factors, wherein the plurality of quality factors include at least one of a delay factor, a jitter factor, a lost data factor and a codec selection factor and wherein the computer readable program code that calculates a network impairment indicator for ones of the plurality of quality factors comprises:
   computer readable program code that calculates a maximum overall call quality rating for the network test protocol;
   computer readable program code that calculates at least one constrained network impairment indicator for ones of the plurality of quality factors; and
   computer readable program code that generates the network impairment indicator for ones of the plurality of quality factors based on the maximum overall call quality rating and the calculated at least one constrained network impairment indicator for ones of the plurality of quality factors.

58. The computer program product of claim 57, wherein the obtained performance data includes a plurality of timing records for a first flow direction and a second flow direction and wherein the computer readable program code that calculates at least one constrained network impairment indicator for ones of a plurality of quality factors comprises:
   computer readable program code that calculates a constrained impairment indicator for ones of the plurality of quality factors for respective ones of the timing records based on the maximum overall call quality rating.

59. The computer program product of claim 58, wherein the computer readable program code that generates the network impairment indicator for ones of the plurality of quality factors comprises computer readable program code that generates an average of the calculated constrained impairment indicators for ones of the plurality of quality factors.

60. The computer program product of claim 57, wherein the overall call quality rating comprises an actual overall call quality rating, the computer program product further comprising:
   computer readable program code that determines a difference between the maximum overall call quality and the actual overall call quality rating; and
   computer readable program code that calculates a network impairment ratio corresponding to respective ones of the network impairment indicators based on the difference between the maximum overall call quality rating and the actual overall call quality rating and corresponding ones of the network impairment indicators.

61. The computer program product of claim 56, wherein the computer readable program code that calculates the network impairment ratios corresponding to respective ones of the network impairment indicators comprises computer readable program code that divides the network impairment indicators for ones of the plurality of quality factors by the difference between the maximum overall call quality rating and the actual overall call quality rating.

62. A computer program product of claim 57, wherein the overall call quality comprises at least one of an R-Value and a MOS value and wherein the maximum overall call quality comprises at least one of an R-Value and a MOS value.

63. The computer program product of claim 57, further comprising computer readable program code that generates a result summary of the network test protocol.

64. The computer program product of claim 63, wherein the computer readable program code that generates a result summary further comprises computer readable program code that generates a chart that illustrates a plurality of network impairment ratios corresponding to respective ones of a plurality of quality factors.

65. The computer program product of claim 64, wherein the computer readable program code that generates a chart comprises computer readable program code that generates a pie chart and wherein ones of the plurality of network impairment ratios has a different associated visual indication on the pie chart.

66. A computer program product for evaluating performance of a network that supports packetized communications, the computer program product comprising:
   a computer-readable storage medium having computer-readable program code embodied in said medium, said computer-readable program code comprising:
   computer-readable program code that initiates execution of a network test protocol associated with the packetized communications:
   computer-readable program code that obtains network performance data based on the initiated network test protocol;
   computer readable program code that generates an overall network quality rating based on the obtained performance data;
   computer readable program code that calculates a network impairment indicator based on the overall network quality rating; and
   computer readable program code that generates a result summary of the network test protocol,
   wherein the packetized communications comprise packetized voice communications, wherein the overall network quality rating comprises an overall call quality rating, wherein the computer readable program code that generates an overall call quality rating comprises computer readable program code that generates an overall call quality rating for ones of a plurality of calls initiated during execution of the network test protocol and wherein the computer readable program code that generates the result summary further comprises:

computer readable program code that associates the overall call quality ratings for ones of the plurality of calls initiated with one of a plurality of quality thresholds; and computer readable program code that generates a chart that groups by associated quality thresholds calls initiated during execution of the network test protocol.

67. The computer program product of claim 66, wherein the computer readable program code that generates a chart further comprises computer readable program code that generates a chart that indicates a percentage of a total number of calls associated with ones of the plurality of quality thresholds.

68. The computer program product of claim 66, wherein the computer readable program code that generates a chart comprises computer readable program code that generates a pie chart and wherein ones of the plurality of quality thresholds has a different associated visual indication on the pie chart.

69. The computer program product of claim 66, wherein the plurality of quality thresholds comprise a good threshold, an acceptable threshold, a poor threshold and/or an unavailable threshold and wherein the quality thresholds are user configurable.

70. The computer program product of claim 69, wherein the good quality threshold indicates a mean opinion score (MOS) of about 4.0 or above, wherein the acceptable quality threshold indicates a MOS of from about 3.60 to about 4.0, wherein the poor quality threshold indicates a MOS of about 3.60 or less, and wherein the unavailable quality threshold indicates that a call could not be connected.

71. A computer program product for evaluating performance of a network that supports packetized communications, the computer program product comprising:

a computer-readable storage medium having computer-readable program code embodied in said medium, said computer-readable program code comprising:

computer-readable program code that initiates execution of a network test protocol associated with the packetized communications;

computer-readable program code that obtains network performance data based on the initiated network test protocol;

computer readable program code that generates an overall network quality rating based on the obtained performance data;

computer readable program code that calculates a network impairment indicator based on the overall network quality rating; and computer readable program code that generates a result summary of the network test protocol, wherein the computer readable program code that generates a result summary of the network test protocol further comprises computer readable program code that generates at least one of a chart illustrating a call quality summary by call group, a daily call quality summary or an hourly call quality summary.

72. The computer program product of claim 71, wherein a call group comprises a plurality of calls initiated over a connection between a first endpoint and a second endpoint utilizing a single call script.

73. A method of evaluating performance of a network that supports packetized communications, the method comprising:

initiating execution of a network test protocol associated with the packetized communications;

obtaining network performance data based on the initiated network test protocol;

generating an overall network quality rating based on the obtained performance data; and calculating at least one network impairment indicator based on the overall network quality rating;

obtaining network utilization data from a plurality of devices/links on the network;

modeling at least a portion of the network based on the obtained network utilization data to provide an associated model of the at least a portion of the network; and estimating a packetized communication capacity for the at least a portion of the network based on its associated model.

74. The method of claim 73, wherein the packetized communications comprise packetized voice communications and wherein the packetized communication capacity comprises a call capacity.

75. The method of claim 73, wherein the at least a portion of the network comprises a link.

76. A method of evaluating a network that supports packetized communications comprising:

obtaining network utilization data from a plurality of devices/links on the network;

associating ones of the plurality of devices/links with one of a plurality of performance thresholds based on the obtained utilization data;

obtaining network performance data based on a network test protocol associated with packetized communications executed on the network; and generating an overall network quality rating based on the obtained performance data, wherein the packetized communications comprise at least one of packetized voice communications or packetized video communications;

modeling at least a portion of the network based on the obtained network utilization data to provide an associated model of the at least a portion of the network; and estimating a packetized communication capacity for the at least a portion of the network based on its associated model.

77. The method of claim 76, wherein obtaining network utilization data comprises obtaining the network utilization data using a simple network management protocol (SNMP).

78. The method of claim 76, further comprising generating a chart that groups by the associated performance thresholds the ones of the plurality of devices/links.

79. The method of claim 78, further comprising grouping the ones of the plurality of devices/links with one of a plurality of device types and wherein generating a chart comprises generating a separate chart for ones of the plurality of device types.

80. The method of claim 76, wherein the packetized communications comprise packetized voice communications and wherein the packetized communication capacity comprises a call capacity.

81. The method of claim 76, wherein the at least a portion of the network comprises a link.

82. The method of claim 76, further comprising scanning the network to discover devices/links on the network and wherein the obtaining network utilization data comprises obtaining network utilization data from the discovered devices.

83. The method of claim 76, further comprising providing a common report generating interface for the obtained network utilization data and associated thresholds and the obtained network performance data and associated overall network quality rating.

* * * * *

UNITED STATES PATENT AND TRADEMARK OFFICE
CERTIFICATE OF CORRECTION

PATENT NO.       : 7,274,670 B2
APPLICATION NO.  : 10/259564
DATED            : September 25, 2007
INVENTOR(S)      : Hicks et al.

It is certified that error appears in the above-identified patent and that said Letters Patent is hereby corrected as shown below:

Column 28, Claim 7, Line 32: Please correct "network impainnent"
        To read -- network impairment --

Column 29, Claim 16, Line 19: Please correct "claim 4,"
        To read -- claim 7, --

Column 29, Claim 20, Line 36: Please correct "claim 4,"
        To read -- claim 7, --

Column 30, Claim 28, Line 47: Please correct "network ciuality"
        To read -- network quality --

Column 31, Claim 30, Line 8: Please correct "a jifter"
        To read -- a jitter --

Signed and Sealed this

Eighteenth Day of December, 2007

JON W. DUDAS
*Director of the United States Patent and Trademark Office*